(12) United States Patent
Zhang et al.

(10) Patent No.: US 10,575,336 B2
(45) Date of Patent: Feb. 25, 2020

(54) SEQUENCE-BASED SHORT-PHYSICAL UPLINK CONTROL CHANNEL (PUCCH) AND PHYSICAL RANDOM ACCESS CHANNEL (PRACH) DESIGN

(71) Applicant: QUALCOMM Incorporated, San Diego, CA (US)

(72) Inventors: Xiaoxia Zhang, San Diego, CA (US); Taesang Yoo, San Diego, CA (US); Kapil Bhattad, Bangalore (IN); Jing Sun, San Diego, CA (US); Tao Luo, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/032,517

(22) Filed: Jul. 11, 2018

(65) Prior Publication Data
US 2019/0045548 A1  Feb. 7, 2019

(30) Foreign Application Priority Data
Aug. 2, 2017  (IN) .............................. 201741027464

(51) Int. Cl.
*H04W 74/08* (2009.01)
*H04B 14/02* (2006.01)
(Continued)

(52) U.S. Cl.
CPC ...... *H04W 74/0833* (2013.01); *H04B 14/026* (2013.01); *H04L 27/2613* (2013.01);
(Continued)

(58) Field of Classification Search
CPC .......... H04W 74/0833; H04W 72/0453; H04B 7/17; H04B 14/026; H04L 5/0053;
(Continued)

(56) References Cited

U.S. PATENT DOCUMENTS

2014/0211677 A1*  7/2014  Barbieri et al. ...... H04W 74/08
                                                        370/311

OTHER PUBLICATIONS

Intel Corporation: "PRACH Transmission for eLAA", 3GPP Draft; R1-164131, 3rd Generation Partnership Project (3GPP), Mobile Competence Centre; 650, Route Des Lucioles; F-06921 Sophia-Anti Polis Cedex; France, vol. RAN WG1, No. Nanjing, China; 20160523-20160527 May 14, 2016, XP051090085, Retrieved from the Internet: URL:http://www.3gpp.org/ftp/tsg_ran/WG1_RL1/TSGR1_85/Docs/ [retrieved on May 14, 2016], 5 pages.

(Continued)

*Primary Examiner* — Ian N Moore
*Assistant Examiner* — Brian T Le
(74) *Attorney, Agent, or Firm* — Liem T. Do

(57) ABSTRACT

Wireless communications systems and methods related to communicating a sequence-based signal in a frequency spectrum are provided. A first wireless communication device obtains a configuration for communicating a sequence-based signal in the frequency spectrum. The configuration indicates resources in a frequency spectrum and a frequency distribution mode of the resources. The first wireless communication device communicates the sequence-based signal with a second wireless communication device in the frequency spectrum based on the configuration. The sequence-based signal includes at least one of a physical uplink control channel (PUCCH) signal or a physical random access channel (PRACH) signal. The frequency distribution mode indicates at least one of a frequency interlaced structure, a frequency comb structure, or a frequency mini-interlaced structure.

30 Claims, 16 Drawing Sheets

(51) Int. Cl.
  *H04L 27/26* (2006.01)
  *H04B 7/17* (2006.01)
  *H04L 5/00* (2006.01)
(52) U.S. Cl.
  CPC .............. *H04B 7/17* (2013.01); *H04L 5/0007* (2013.01); *H04L 5/0048* (2013.01)
(58) Field of Classification Search
  CPC ... H04L 5/0017; H04L 5/0041; H04L 5/0048; H04L 5/0007; H04L 5/0051; H04L 27/2613; H04L 27/2602
  See application file for complete search history.

(56) References Cited

OTHER PUBLICATIONS

Intel Corporation: "UL Waveform for eLAA: B-IFDMA", 3GPP Draft; R1-160419, 3rd Generation Partnership Project (3GPP), Mobile Competence Centre; 650, Route Des Lucioles; F-06921 Sophia-Anti Polis Cedex; France, vol. RAN WG1, No. St. Julian's, Malta; 20160215-20160219 Feb. 14, 2016, XP051053756, Retrieved from the Internet: URL:http://www.3gpp.org/ftp/Meetings_3GPP_SYNC/RAN1/Docs/ [retrieved on Feb. 14, 2016], 5 pages.

International Search Report and Written Opinion—PCT/US2018/041859—ISA/EPO—dated Oct. 4, 2018.

Lenovo: "UCI Transmission on LAA SCell", 3GPP Draft; R1-162731, 3rd Generation Partnership Project (3GPP), Mobile Competence Centre; 650, Route Des Lucioles; F-06921 Sophia-Anti Polis Cedex; France, vol. RAN WG1, No. Busan, Korea; 20160411-20160415 Apr. 1, 2016, XP051079836, Retrieved from the Internet: URL:http://www.3gpp.org/ftp/tsg_ran/WG1_RL1/TSGR1_84b/Docs/ [retrieved on Apr. 1, 2016], 5 pages.

Samsung: "PRACH Transmission for UL LAA", 3GPP Draft; R1-164748 LAA PRACH, 3rd Generation Partnership Project (3GPP), Mobile Competence Centre; 650, Route Des Lucioles; F-06921 Sophia-Anti Polis Cedex; France, vol. RAN WG1, No. Nanjing, China; 20160523-20160527 May 14, 2016, XP051096335, Retrieved from the Internet: URL:http://www.3gpp.org/ftp/tsg_ran/WG1_RL1/TSGR1_85/Docs/ [retrieved on May 14, 2016], 3 pages.

\* cited by examiner

SEQUENCE-BASED SHORT-PHYSICAL UPLINK CONTROL CHANNEL (PUCCH) AND PHYSICAL RANDOM ACCESS CHANNEL (PRACH) DESIGN

CROSS REFERENCE TO RELATED APPLICATIONS

The present application claims priority to and the benefit of the India Patent Application No. 201741027464, filed Aug. 2, 2017, which is hereby incorporated by reference in its entirety as if fully set forth below and for all applicable purposes.

TECHNICAL FIELD

This application relates to wireless communication systems and methods, and more particularly to communicating sequence-bases signals in a frequency spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Some spectrums may have certain PSD requirements. For example, the European Telecommunications Standard Institute (ETSI) document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD requirements and/or different bandwidth occupancy requirements.

Some communications may represent information using waveform sequences instead of payload data. In some instances, different users may transmit different waveform sequences to indicate different information. In addition, different users may be assigned with different resources for transmitting the waveform sequences. When a waveform sequence has a short sequence length, the waveform sequence may occupy a narrow frequency band. When a frequency spectrum has a certain PSD requirement, the narrowband transmission may result in a performance loss. Accordingly, improved procedures for sequence-based signal transmissions in different frequency spectrums with different PSD requirements and multiplexing sequence-based transmissions from different users are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes obtaining, by a first wireless communication device, a configuration for communicating a sequence-based signal in a frequency spectrum, the configuration indicating resources in the frequency spectrum and a frequency distribution mode of the resources; and communicating, by the first wireless communication device with a second wireless communication device in the frequency spectrum based on the configuration, the sequence-based signal.

In an additional aspect of the disclosure, an apparatus includes a processor configured to obtain a configuration for communicating a sequence-based signal in a frequency spectrum, the configuration indicating resources in the frequency spectrum and a frequency distribution mode of the resources; and a transceiver configured to communicate, with a second wireless communication device in the frequency spectrum based on the configuration, the sequence-based signal.

In an additional aspect of the disclosure, a computer-readable medium having program code recorded thereon, the program code includes code for causing a first wireless communication device to obtain a configuration for communicating a sequence-based signal in a frequency spectrum, the configuration indicating resources in the frequency spectrum and a frequency distribution mode of the resources; and code for causing the first wireless communication device to communicate, with a second wireless communication device in the frequency spectrum based on the configuration, the sequence-based signal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
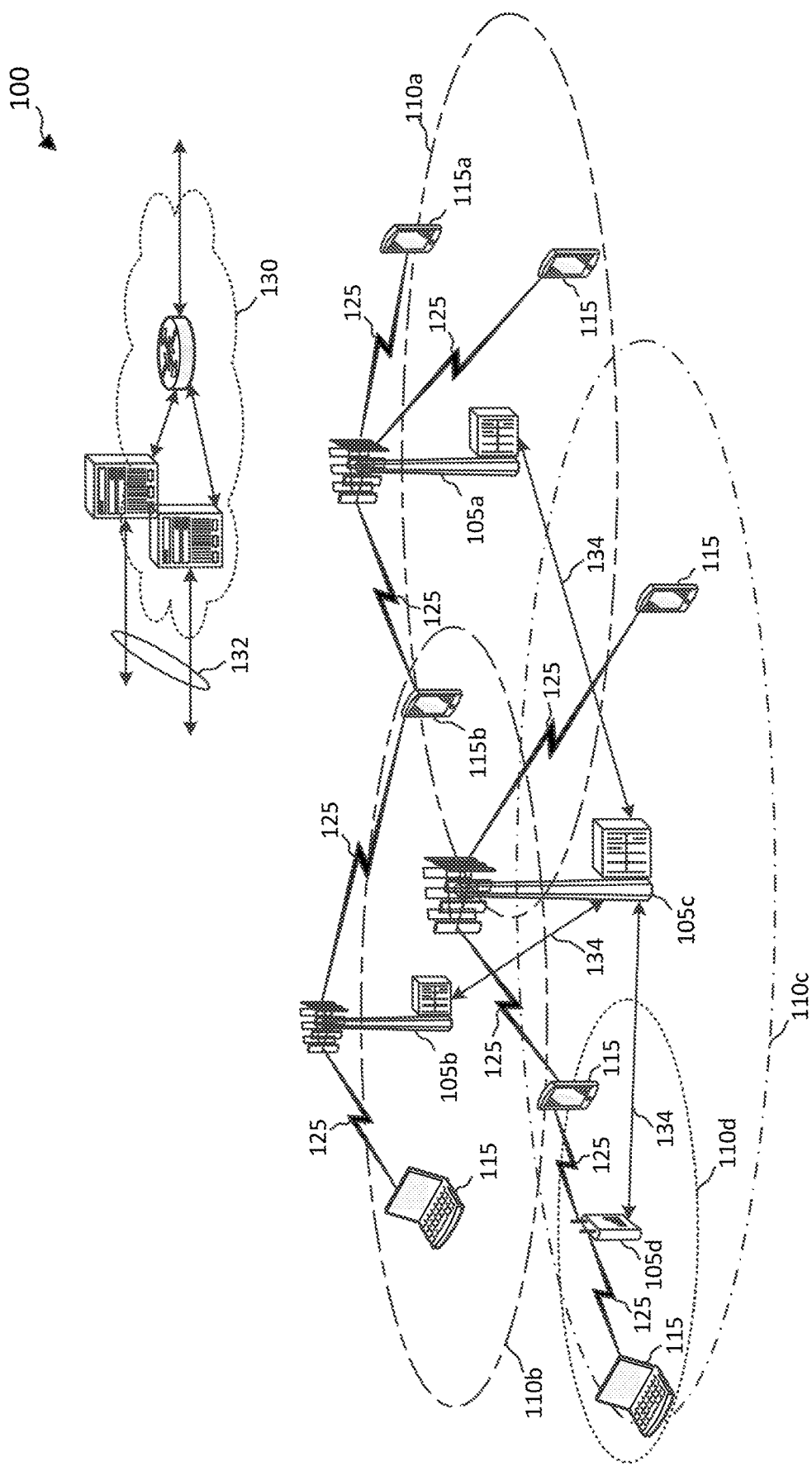
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for communicating sequence-based signals in a frequency spectrum. The sequence-based signals may represent feedback information (e.g., an ACK or a NAK), random access requests, or any uplink control related information. In the disclosed embodiments, a BS may configure resources and/or sequences for a UE to transmit sequence-based signals. The BS may distribute the resources across a frequency spectrum based on sequence separation requirements, channel coherency requirements, a subcarrier spacing (SCS), PSD requirements, and/or the UE transmit power capability. The distribution may be at various frequency granularities.

In an embodiment, the frequency spectrum may be divided into a plurality of frequency interlaces. Each frequency interlace may include K plurality of resource blocks (RBs) spaced apart from each other by at least one other RB, where K is a positive integer. Each RB may include a plurality of contiguous subcarriers (e.g., about 12). The BS may allocate resources in units of frequency interlaces. A UE may generate a sequence with a sequence length based on the number of assigned subcarriers.

In an embodiment, the frequency spectrum may be divided into a plurality of frequency combs. Alternatively, a subband within the frequency spectrum may be divided into a plurality of frequency combs. Each frequency comb may include a plurality of subcarriers distributed over K equally spaced RBs, K contiguous RBs, or a subband in the frequency spectrum. The subcarriers are spaced apart from each other by at least one other subcarrier within the K equally spaced RBs, the K contiguous RBs, or the subband. The BS may allocate resources in units of frequency combs.

In an embodiment, the frequency spectrum may be divided into a plurality of frequency mini-interlaces. Each frequency mini-interlace may include a plurality of sets of contiguous subcarriers distributed over K equally spaced RBs or K contiguous RBs in the frequency spectrum. The sets of contiguous subcarriers are spaced apart from each other by at least one other set of contiguous subcarriers within the K equally spaced RBs or the K contiguous RBs. The BS may allocate resources in units of frequency mini-interlaces.

In an embodiment, the BS may allocate K contiguous RBs to a UE when a SCS used for communication is sufficiently large. In an embodiment, a BS may assign UE-specific, sequence-specific resources to a UE. For example, each UE may be assigned with multiple sets of resources for transmitting different sequences. In an embodiment, a BS may assign the same set of resources to multiple UEs, but may assign the UEs with different sequences for CDM.

Aspects of the present application can provide several benefits. For example, the use of frequency-distributed resources may improve power utilization at a transmitter. The use of frequency combs may allow for a large number of UEs to be assigned over a set of resources (e.g., K number of RBs). The use of frequency mini-interlaces may provide better channel coherency than using frequency combs. The use of CDM may further increase the number of UEs that can be assigned over a set of resources. The use of UE-specific, sequence-based resources may improve detection performance at a receiver. The use of distributed resources over a particular subband may allow other channel transmissions to be easily multiplexed with the sequence-based transmissions using frequency-division multiplexing (FDM) and/or time-division multiplexing (TDM). The disclosed embodiments may be suitable for use in any wireless communication network with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 may perform transmit power control (TPC) instead of transmitting at a full power to allow for multiplexing in a frequency domain, multiplexing in a spatial domain, and/or interference management. For example, a UE 115 may reduce the transmit power to a minimum power sufficient to maintain a communication link 125 at a certain quality.

In an embodiment, the network 100 may operate over a shared channel, which may include a licensed spectrum, a shared spectrum, and/or an unlicensed spectrum, and may support dynamic medium sharing. A BS 105 or a UE 115 may reserve a transmission opportunity (TXOP) in a shared channel by transmitting a reservation signal prior to transmitting data in the TXOP. Other BSs 105 and/or other UEs 115 may listen to the channel and refrain from accessing the channel during the TXOP upon detection of the reservation signal. In some embodiments, the BSs 105 and/or the UEs 115 may coordinate with each other to perform interference management for further spectrum utilization improvements.

In an embodiment, the network 100 may operate over various frequency bands, for example, in frequency ranges between about 2 GHz to above 60 GHz. Different frequency bands may have different PSD requirements. As described above, the ETSI document EN 301 893 V2.1.1 specifies PSD requirements for various sub-6 GHz bands. For example, the frequency band between about 5150 MHz and about 5350 MHz may have a maximum allowable PSD level of about 10 dBm/MHz with TPC. The frequency band between about 5250 MHz and about 5350 MHz may have a maximum allowable PSD level of about 7 dBm/MHz without TPC. The frequency band between about 5150 MHz and about 5250 MHz may have a maximum allowable PSD level of about 10 dBm/MHz without TPC. The frequency band between about 5470 MHz and about 5725 MHz may have a maximum allowable PSD level of about 17 dBm/MHz with TPC and a maximum allowable PSD level of about 14 dBm/MHz without TPC. The ETSI draft document EN 302 567 V2.0.22 specifies a maximum EIRP and an EIRP density for 60 GHz bands. For example, a 60 GHz band may allow an EIRP density of about 13 dBm/MHz and an EIRP of about 40 dBm.

To satisfy a certain PSD requirement in a frequency spectrum, a transmitter (e.g., the BSs 105 and the UEs 115) may distribute the frequency occupancy of a transmission signal over a wider bandwidth. For example, a transmitter may transmit a signal over multiple narrow frequency bands spaced apart from each other in a frequency bandwidth at a higher power than transmitting the signal over contiguous frequencies. The distribution of the frequency occupancy may be in various granularities and forms, such as frequency interlaces, frequency combs, and frequency mini-interlaces, as described in greater detail herein.

Some communications between the BSs 105 and the UEs 115 may be sequence-based instead of payload-based. Sequence-based communications refer to using different waveform sequences to communicate different information. Payload-based communications refer to communicating signals carrying information data bits. Some examples of sequence-based communications may include feedback signal and random access signal transmissions.

In an embodiment of a feedback communication, a BS 105 may transmit a data signal to a UE 115. The UE 115 may indicate a successful reception of the data signal by transmitting a sequence to represent an acknowledgement (ACK) or indicate an unsuccessful reception by transmitting a different sequence to represent a not-ACK (NAK).

In an embodiment of a random access communication, a UE 115 may transmit a random access preamble sequence to request an access or connection to the network 100. Mechanisms for semi-statically and/or dynamically configuring resources for sequence-based communications to satisfy PSD requirements and to provide separations between different sequences and from different UEs 115 are described in greater detail herein.

Figure 2:
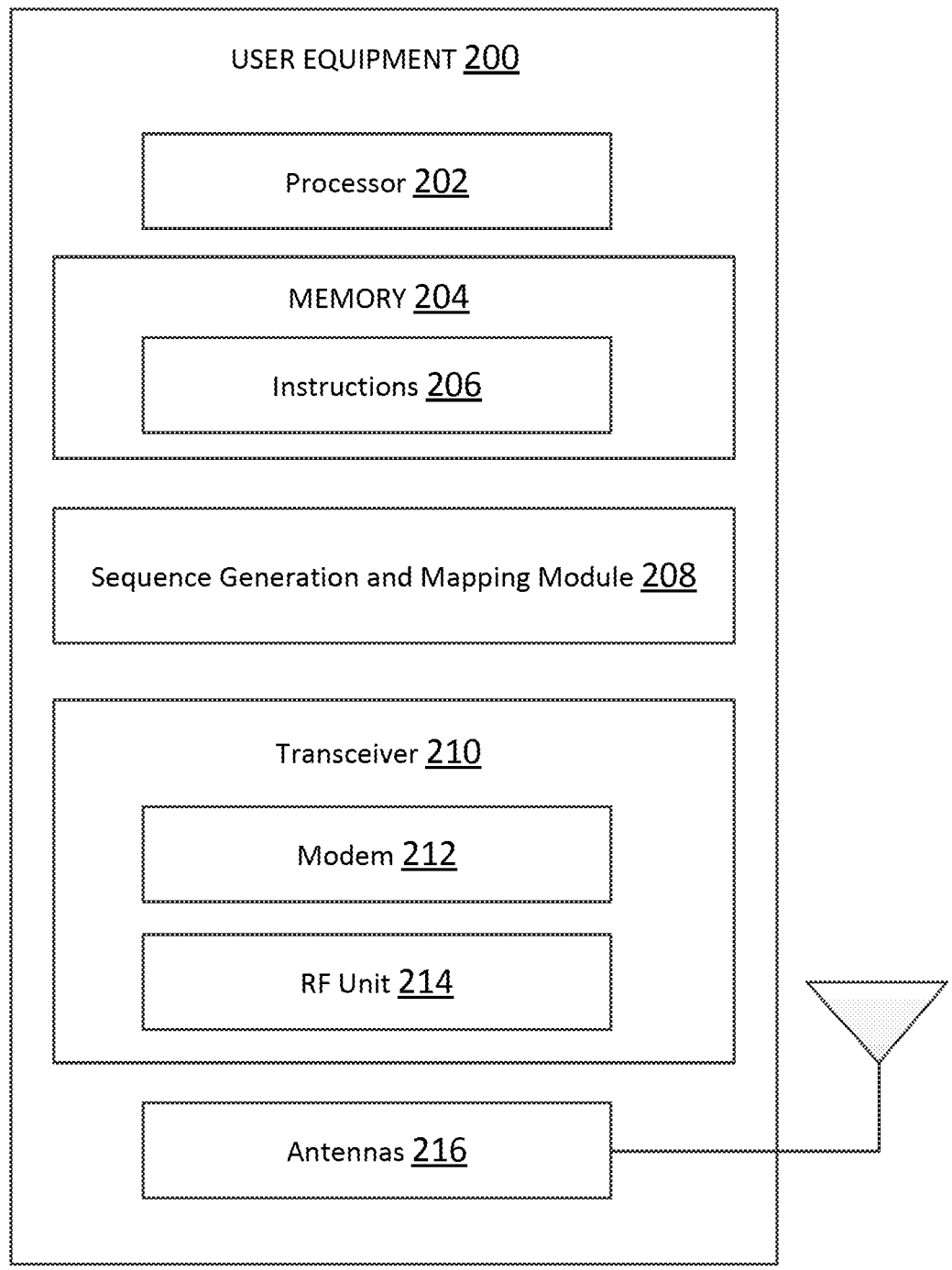
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a sequence generation and mapping module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sequence generation and mapping module 208 may be implemented via hardware, software, or combinations thereof. For example, the sequence generation and mapping module 208 may be implemented as a processor, circuit, and/or instructions 206 stored in the memory 204 and executed by the processor 202. The sequence generation and mapping module 208 may be used for various aspects of the present disclosure. For example, the sequence generation and mapping module 208 is configured to receive a configuration for sequence-based signal transmissions, generate sequences (e.g., ACKs, NAKs, random access requests, and/or UL control information), and/or map sequences to resources (e.g., frequency interlaces, frequency combs, and frequency mini-interlaces) for transmissions, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the sequence generation and mapping module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmission of communication signals using frequency interlaces, frequency combs, and/or frequency mini-interlaces according to embodiments of the present disclosure. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
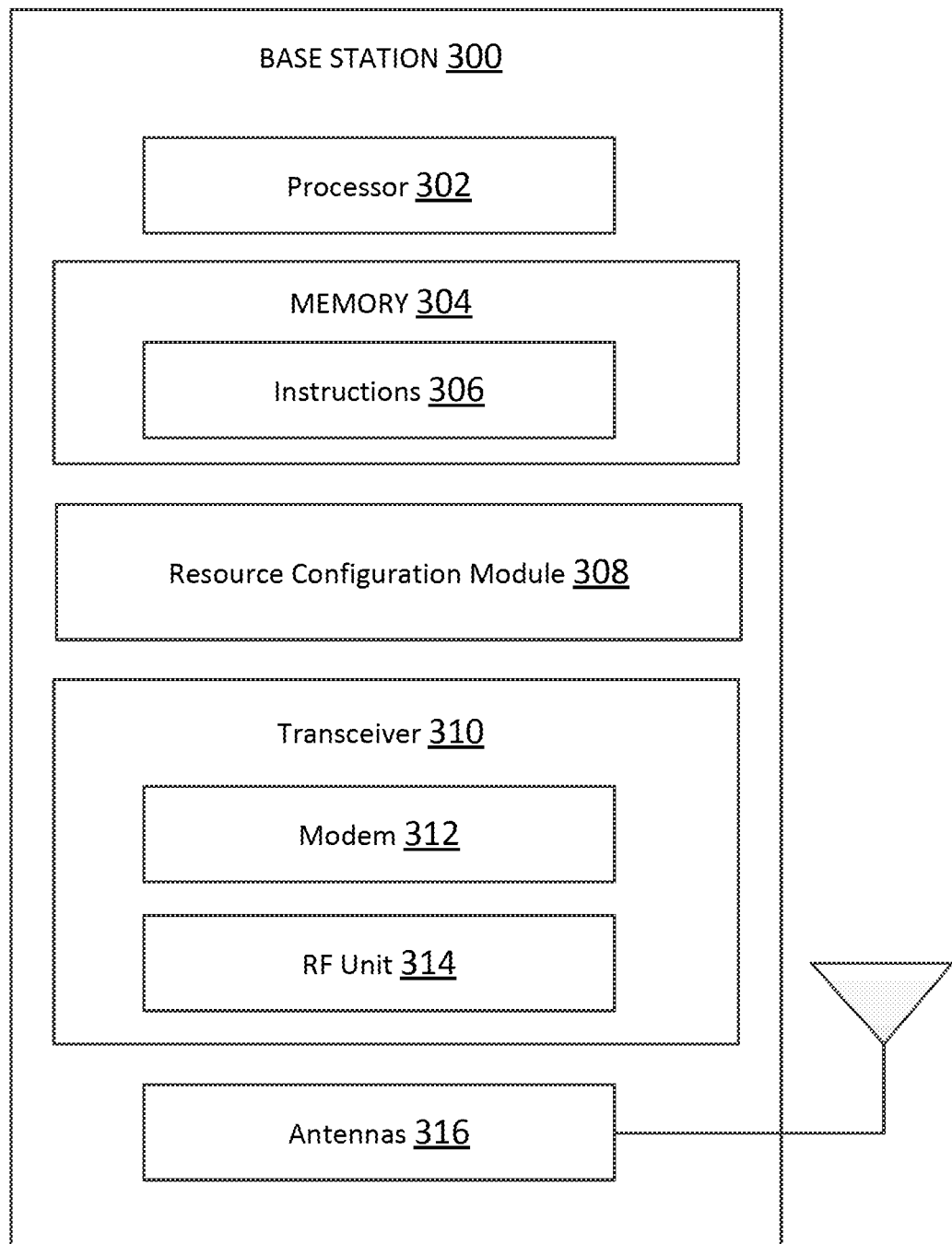
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, a resource configuration module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The resource configuration module 308 may be implemented via hardware, software, or combinations thereof. For example, the resource configuration module 308 may be implemented as a processor, circuit, and/or instructions 306 stored in the memory 304 and executed by the processor 302. The resource configuration module 308 may be used for various aspects of the present disclosure. For example, the resource configuration module 308 is configured to assign resources for UEs (e.g., the UEs 115 and 200) to transmit sequence-based signals based on sequence separation requirements, channel coherency requirements, PSD requirements, an SCS, and/or transmit power limits of UEs, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
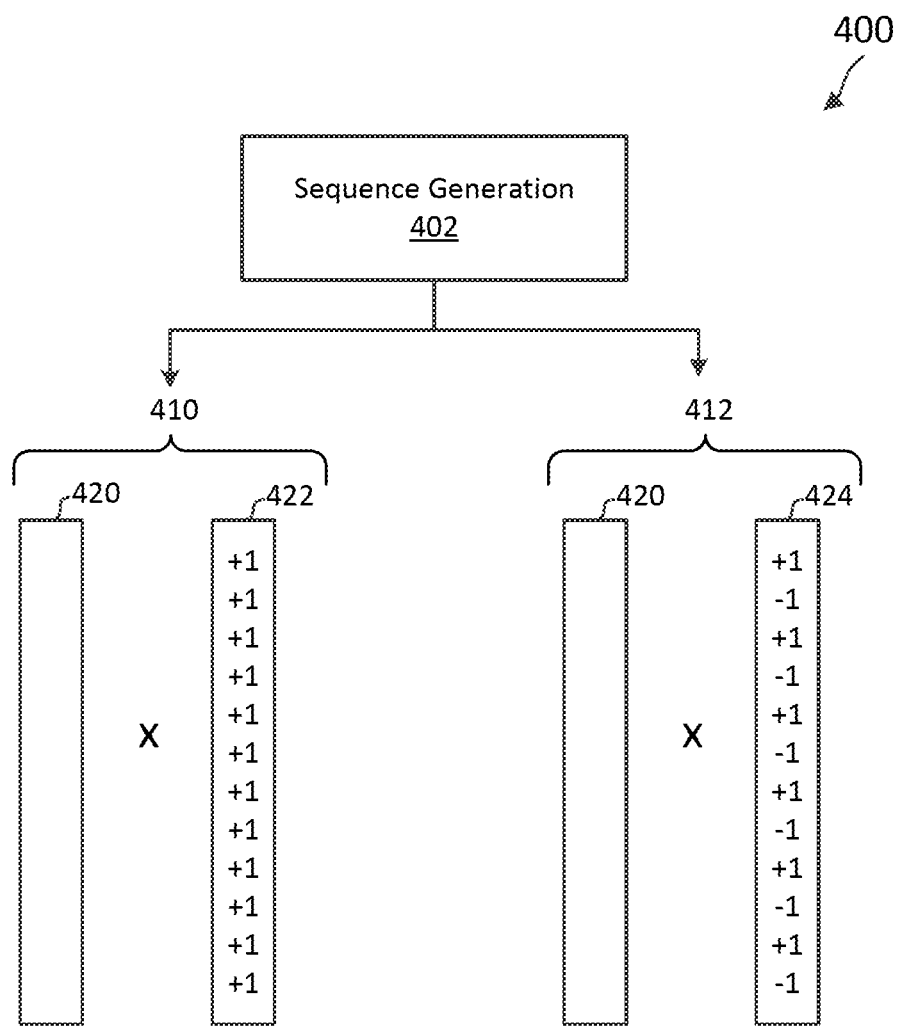
FIG. 4 illustrates a sequence-based signal generation scheme according to embodiments of the present disclosure.

FIG. 4 illustrates a sequence-based signal generation scheme 400 according to embodiments of the present disclosure. The scheme 400 may be employed by UEs such as the UEs 115 and 200 to communicate information using waveform sequences. The scheme 400 includes a sequence generation component 402. For example, the sequence generation component 402 may be a sub-module within the sequence generation and mapping module 208. The sequence generation component 402 is configured to generate a sequence 410 or a sequence 412 to represent 1-bit information. For example, the sequence 410 may represent a bit-value of 1 and the sequence 412 may represent a bit-value of 0. In an embodiment, hybrid automatic repeat request (HARQ) may be used for communications. In such an embodiment, the sequences 410 and 412 are feedback signals for a data packet or transport block (TB) received from a BS (e.g., the BSs 105 and 300). The sequences 410 may represent an ACK for a TB and the sequence 412 may represent a NAK for the TB.

In the scheme 400, the sequence 410 may be generated by multiplying a predetermined underlying sequence 420 with a frequency phase-shift sequence 422. The sequence 412 may be generated by multiplying the sequence 420 with another frequency phase-shift sequence 424. In an embodiment, the sequence 420 may be a Zadoff-Chu sequence, where cyclically-shifted versions of the sequence are orthogonal. As shown, the sequence 422 includes values of +1 and the sequence 424 includes values of alternating values of +1 and −1. Thus, a receiver may differentiate between the sequences 410 and 412 based on frequency phase-shifts in a received signal.

In an embodiment, the sequences 420, 422, and 424 may have the same sequence length, denoted as L. Thus, the sequences 410 and 412 may have the same sequence length L. During transmission, each of the L values in the sequence 410 or 412 may be mapped to a subcarrier. As such, the sequence generation component 402 may generate the sequences 420, 422, and 424 based on a number of resources (e.g., subcarriers) allocated for the transmission.

Figure 5:
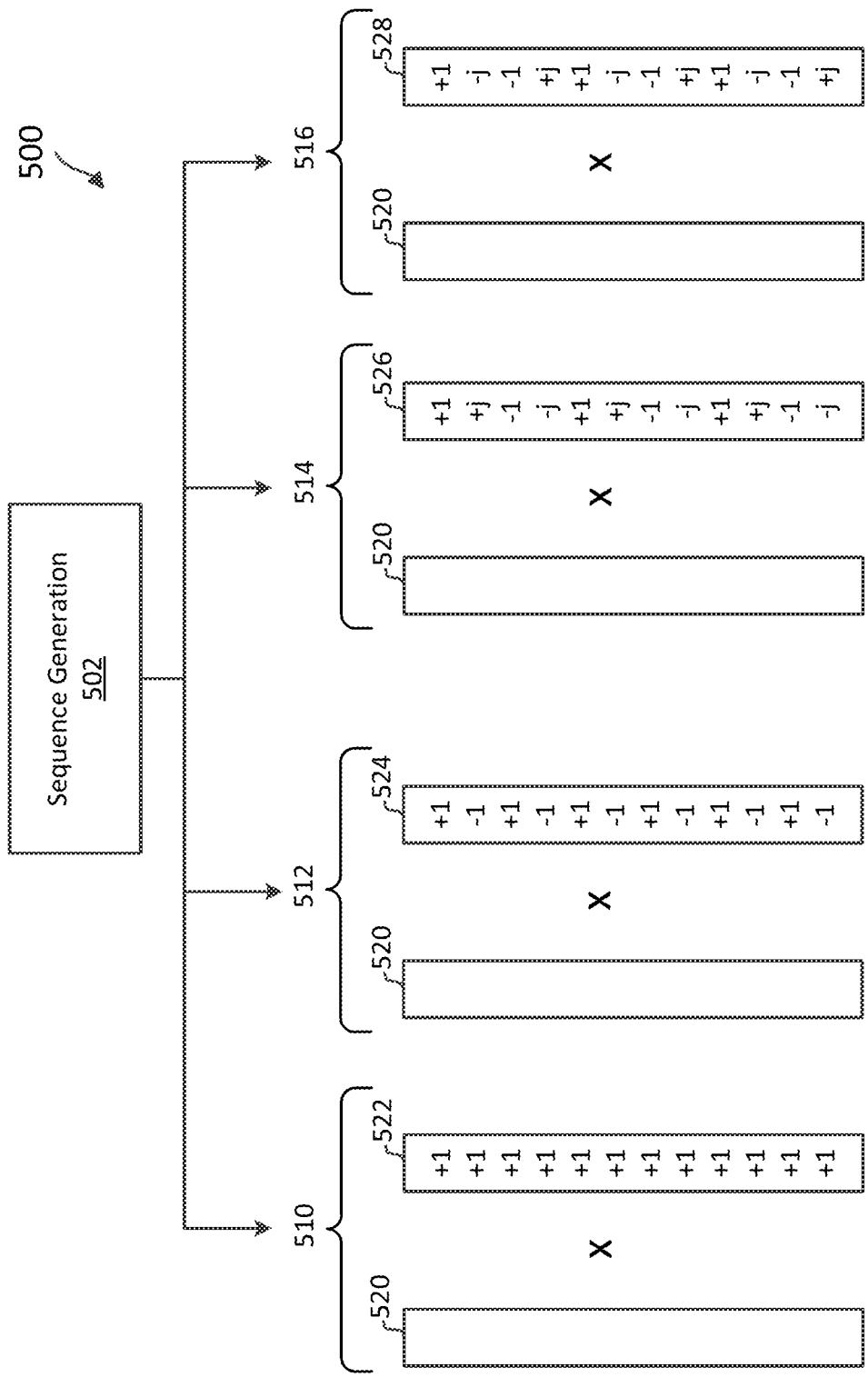
FIG. 5 illustrates a sequence-based signal generation scheme according to embodiments of the present disclosure.

FIG. 5 illustrates a sequence-based signal generation scheme 500 according to embodiments of the present disclosure. The scheme 500 may be employed by UEs such as the UEs 115 and 200 to communicate information using sequences. The scheme 500 includes a sequence generation component 502 substantially similar to the sequence generation component 402. However, the sequence generation component 502 is configured to generate sequences 510, 512, 514, or 516 to represent 2-bit information. For example, the sequences 510, 512, 514, or 516 may represent a bit-value of 0, 1, 2, and 3, respectively. In an embodiment, the sequences 510, 512, 514, and 516 are feedback signals for two TBs. The sequence 510 may represent an ACK for a first TB and an ACK for a second TB. The sequence 512 may represent an ACK for a first TB and a NAK for a second TB. The sequence 510 may represent a NAK for a first TB and an ACK for a second TB. The sequence 510 may represent a NAK for a first TB and a NAK for a second TB.

Similar to the scheme 400, the sequence 510 may be generated by multiplying a predetermined underlying sequence 520 (e.g., a Zadoff-Chu sequence) with a frequency phase-shift sequence 522. The sequence 512 may be generated by multiplying the sequence 520 with a frequency phase-shift sequence 524. The sequence 514 may be generated by multiplying the sequence 520 with a frequency phase-shift sequence 526. The sequence 516 may be generated by multiplying the sequence 520 with a frequency phase-shift sequence 528. As shown, the sequence 522 includes values of +1, the sequence 524 includes alternating values of +1 and −1, the sequence 526 includes repeating values of +1, +j, −1, and −j, and the sequence 528 includes repeating values of +1, −j, −1, and +j. Thus, a receiver may differentiate among the sequences 510, 512, 514, and 516 based on the amount of frequency phase-shifts in a received signal.

While the schemes 400 and 500 illustrate the use of frequency phase-shift sequences to represent different information, the sequence generation components 402 and/or 502 may be alternatively configured to use different underlying sequences (e.g., the sequences 420 and 520) to achieve similar functionalities.

FIGS. 6 to 13 illustrate various mechanisms for configuring and distributing frequency occupancy of resources for sequence-based communications. Some examples of sequence-based communications may include physical random access channel (PRACH) and PUCCH communications. A PRACH is used for carrying random access preambles used for initiation of a random access procedure. For example, a UE 115 may transmit a random access preamble (e.g., a predetermined sequence) to initiate an initial network access with a BS 105. A PUCCH is used for carrying UL control related information. For example, a UE 115 may transmit a feedback (e.g., the sequences 410, 412, 510, 512, 514, and 516) to indicate a successful reception or an unsuccessful reception from a BS 105. In FIGS. 6 to 13, the x-axes represent time in some constant units, and the y-axes represent frequency in some constant units.

Figure 6:
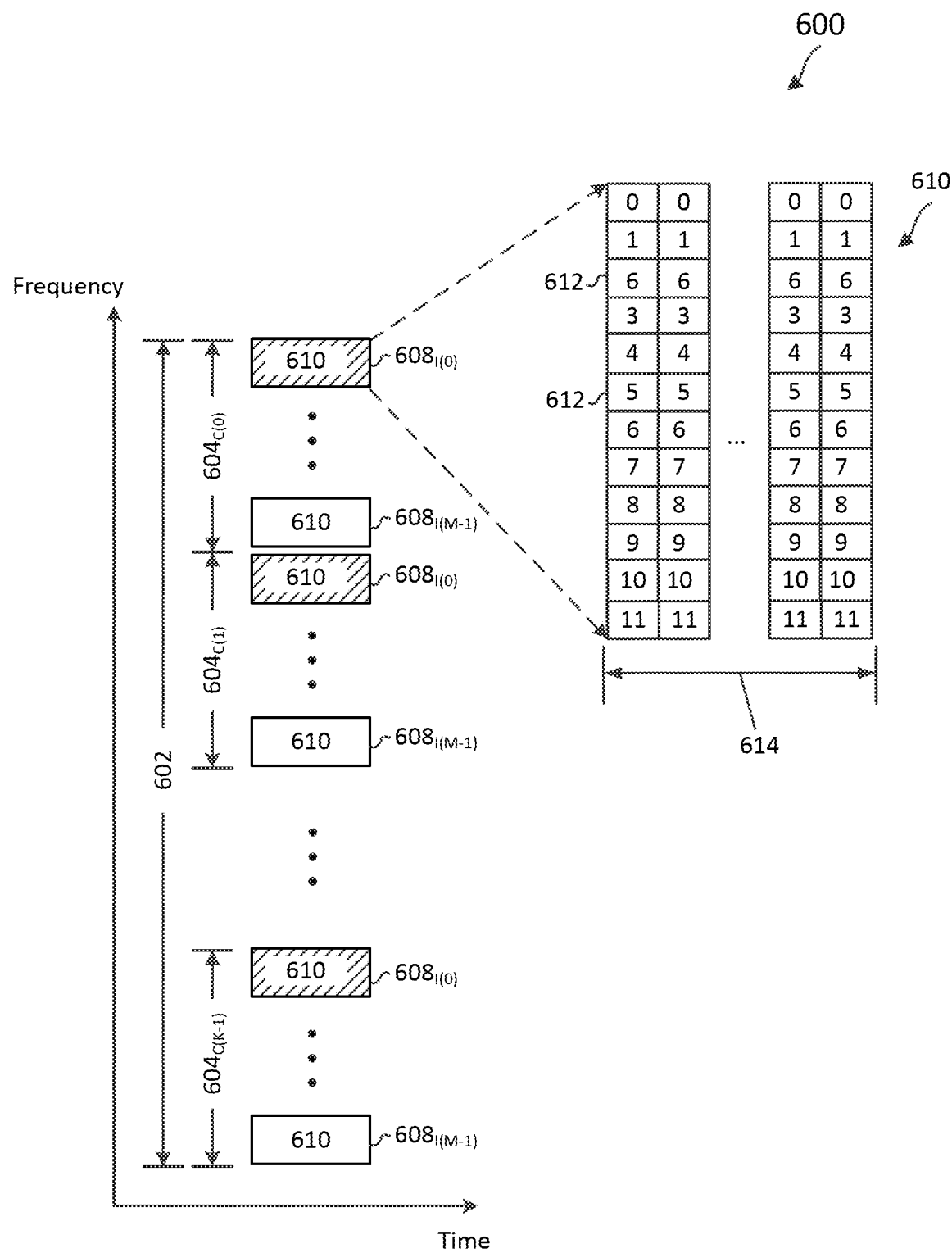
FIG. 6 illustrates a resource configuration scheme with frequency interlaces according to embodiments of the present disclosure.

FIG. 6 illustrates a resource configuration scheme 600 with frequency interlaces according to embodiments of the present disclosure. The scheme 600 may be employed by BSs such as the BSs 105 and 300 and UEs such as the UEs 115 and 200 to communicate over a frequency spectrum 602. The frequency spectrum 602 may have a bandwidth of about 10 megahertz (MHz) or about 20 MHz and an SCS of about 15 kHz, about 30 kHz, or about 60 kHz. The frequency spectrum 602 may be located at any suitable frequencies. In some embodiments, the frequency spectrum 602 may be located at about 3.5 GHz, 6 GHz, or 60 GHz. The scheme 600 allocates resources in units of frequency interlaces 608.

The frequency interlaces are shown as $608_{I(0)}$ to $608_{I(M-1)}$, where M is a positive integer. Each frequency interlace 608 may include K plurality of RBs 610 evenly spaced over the frequency spectrum 602, where K is a positive integer. In other words, the RBs 610 in a particular frequency interlace $608_{I(i)}$ are spaced apart from each other by at least one other RB 610, where i may vary between 0 and M−1. The values of K and M may vary based on several factors, such as the bandwidth, the SCS, and/or the PSD limitation of the frequency spectrum 602, as described in greater detail herein. In an embodiment, the frequency interlace $608_{I(0)}$ may be assigned to one UE and the frequency interlace $608_{I(1)}$ may be assigned to another UE. As an example, an allocation using the frequency interlace $608_{I(0)}$ are shown as patterned boxes.

A group of M localized RBs 610 forms a cluster 604. As shown, the frequency interlaces $608_{I(0)}$ to $608_{I(M-1)}$ form K clusters $604_{C(0)}$ to $604_{C(K-1)}$. Each RB 610 may span about twelve contiguous subcarriers 612 in frequency and a time period 614. The subcarriers 612 are indexed from 0 to 11. The time period 614 may span any suitable number of OFDM symbols. In some embodiments, the time period 614 may correspond to one transmission time interval (TTI), which may include about fourteen OFDM symbols.

The number of clusters 604 or the value of K may be dependent on the amount of frequency distribution required to maintain a certain PSD level. As an example, the scheme 600 may divide the frequency spectrum 602 into about ten clusters 604 (e.g., K=10) and distribute an allocation over the ten clusters 604 to increase a frequency occupancy of the allocation. In an embodiment, the frequency spectrum 602 may have a bandwidth of about 20 MHz and each subcarrier 612 may span about 15 kHz in frequency. In such an embodiment, the frequency spectrum 602 may include about ten frequency interlaces 608 (e.g., M=10). For example, an allocation may include one frequency interlace 608 having ten distributed or equally spaced RBs 610. Compared to an allocation with a single RB or ten localized RBs, the interlaced allocation with the ten distributed RBs 610 allows a UE to transmit at a higher power while maintaining the same PSD level.

In another embodiment, the frequency spectrum 602 may have a bandwidth of about 10 MHz and each subcarrier 612 may span about 15 kHz in frequency. In such an embodiment, the frequency spectrum 602 may include about five frequency interlaces 608 (e.g., M=5). Similarly, an allocation may include one frequency interlace 608 having ten distributed RBs 610. The interlaced allocation with the ten distributed RBs may allow for better power utilization than an allocation with a single RB or ten localized RBs at the same PSD level In another embodiment, the frequency spectrum 602 may have a bandwidth of about 20 MHz and each subcarrier 612 may span about 30 kHz in frequency. In such an embodiment, the frequency spectrum 602 may include about five frequency interlaces 608 (e.g., M=5). Similarly, an allocation may include one frequency interlace 608 having ten distributed RBs 610. The interlaced allocation with the ten distributed RBs may allow for better power utilization than an allocation with a single RB or ten localized RBs at the same PSD level.

The use of frequency interlacing to distribute an allocation into a wider bandwidth allows a transmitter to transmit at a higher power level than when an allocation occupies contiguous frequencies. As an example, the frequency spectrum 602 may have a maximum allowable PSD level of about 13 decibel-milliwatts per megahertz (dBm/MHz) and a transmitter (e.g., the UEs 115 and 200) may have a power amplifier (PA) capable of transmitting at about 23 dBm. Distributing frequency occupancy of an allocation into five clusters 604 may allow the transmitter to transmit at about 20 dBm (e.g., with a power boost of about 7 dB) while maintaining a PSD level of about 13 dBm/MHz. Distributing frequency occupancy of an allocation into ten clusters 604 may allow the transmitter to transmit at a full power of about 23 dBm (e.g., with a power boost of about 10 dB) while maintaining a PSD level of about 13 dBm/MHz. Thus, the use of frequency interlacing can provide better power utilization.

In an embodiment, the scheme 600 may be applied to a physical random access channel (PRACH) and a PUCCH to provide a power boost at a transmitter. For example, a UE may transmit a random access preamble sequence to a BS during an initial network access over a PRACH using one frequency interlace 608 and/or transmit a feedback (e.g., the sequences 410, 412, 510, 512, 514, and 516) to a BS over a PUCCH using one frequency interlace 608. To enable a sufficient bandwidth distribution, the sequence generation components 402 and 502 and/or the sequence generation and mapping module 208 may generate a sequence with an extended length to match a number of RBs 610 or subcarriers 612 in an allocation. While an RB 610 may span multiple OFDM symbols, a sequence-based signal transmission may typically span one, two, or three OFDM symbols. Thus, in some embodiments, a sequence-based signal can be time-multiplexed with another signal in a RB 610.

Figure 7:
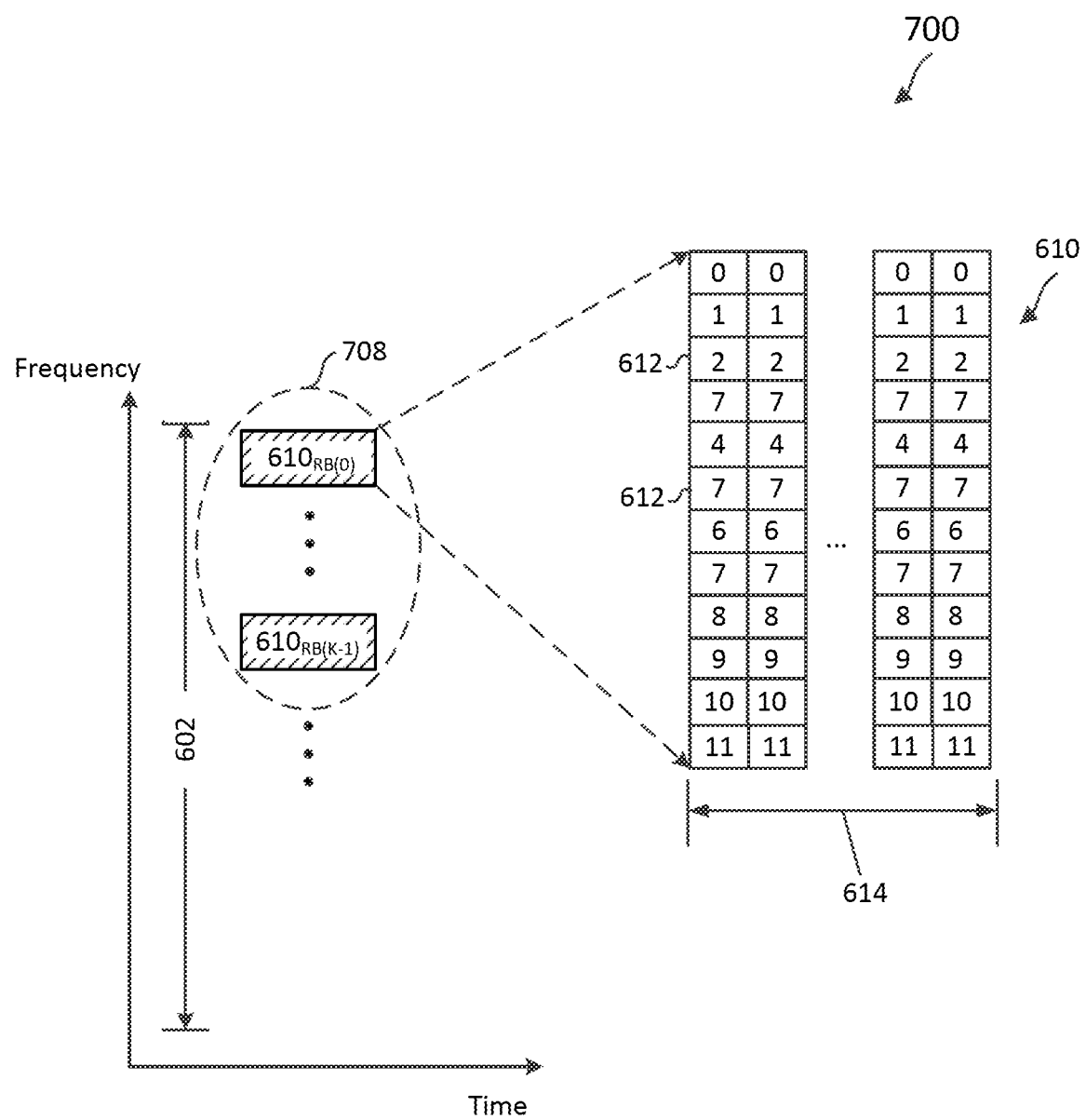
FIG. 7 illustrates a resource configuration scheme with frequency-localized resources according to embodiments of the present disclosure.

FIG. 7 illustrates a resource configuration scheme 700 with frequency-localized resources according to embodiments of the present disclosure. The scheme 700 may be employed by BSs such as the BSs 105 and 300 and UEs such as the UEs 115 and 200 to communicate over a frequency spectrum 602. The scheme 700 may be employed when the SCS in the frequency spectrum 602 is sufficiently large. For example, the frequency spectrum 602 may have an SCS of about 60 kHz or greater than 60 kHz. When the SCS is sufficiently large, the allowable transmit power for a certain PSD requirement may be less limited. Thus, the scheme 700 may assign an allocation with a group 708 of K contiguous or localized RBs 610 instead of K distributed RBs 610 as in the scheme 600. As an example, an allocation using the frequency interlace $608_{I(0)}$ are shown as patterned boxes.

Figure 8:
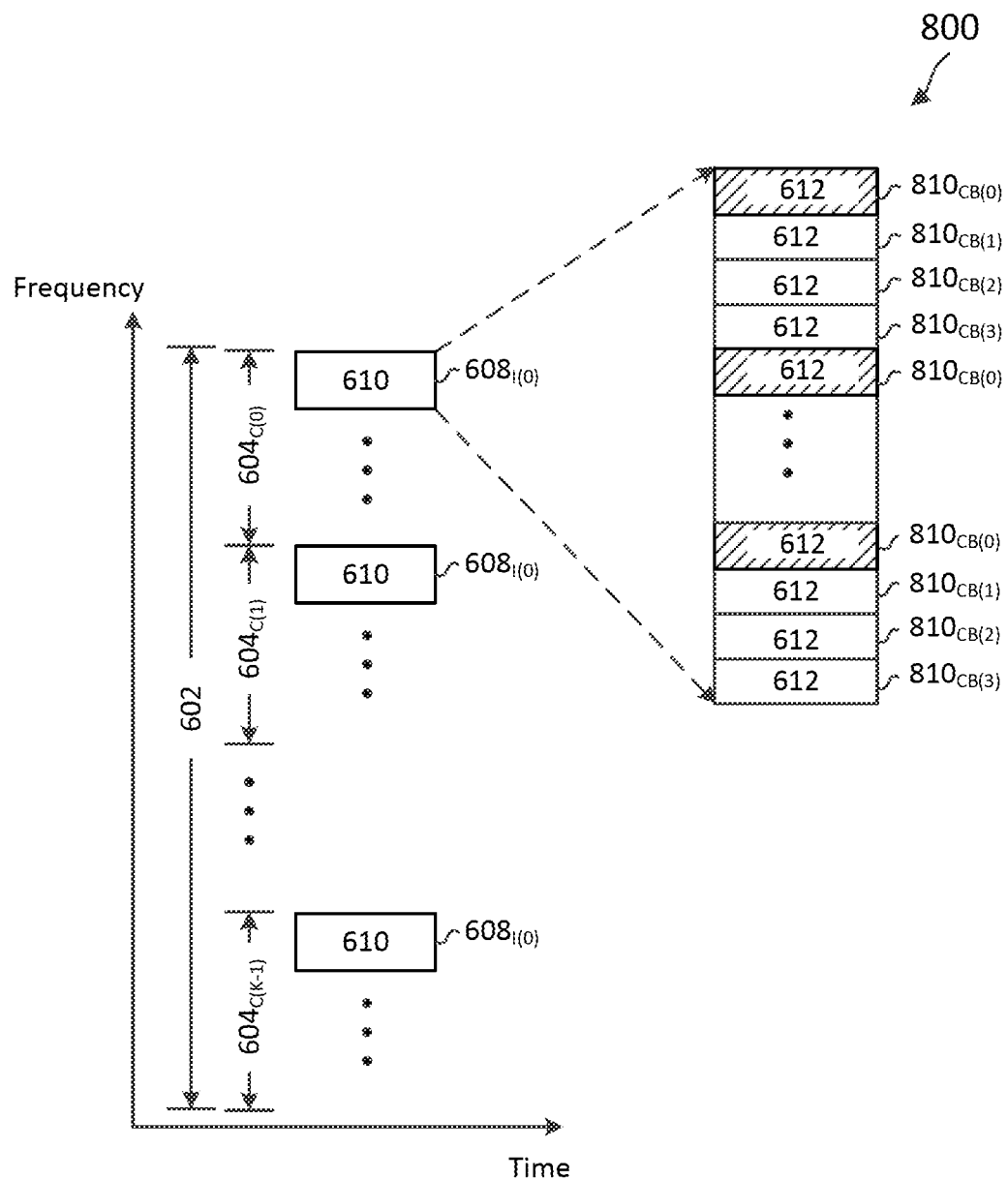
FIG. 8 illustrates a resource configuration scheme with frequency combs according to embodiments of the present disclosure.

FIG. 8 illustrates a resource configuration scheme 800 with frequency combs according to embodiments of the present disclosure. The scheme 800 may be employed by BSs such as the BSs 105 and 300 and UEs such as the UEs 115 and 200 to communicate over a frequency spectrum 602. The scheme 800 distributes the frequency occupancy of an allocation using frequency combs 810 over K distributed RBs 610. The scheme 800 partitions each RB 610 into multiple interleaving frequency combs 810. For example, the scheme 800 may include four frequency combs 810 in a set of K distributed RBs 610.

The frequency combs 810 are shown as $810_{CB(0)}$, $810_{CB(1)}$, $810_{CB(2)}$, and $810_{CB(3)}$. Each frequency comb 810 includes a plurality of distributed or equally spaced subcarriers 612 within K distributed RBs 610. In other words, the subcarriers 612 in a particular frequency comb $810_{CB(i)}$ are spaced apart from each other by at least one other subcarrier 612, where i may vary between 0 and 3. For example, the scheme 800 may allocate the frequency comb $810_{CB(0)}$ to one UE and the frequency comb $810_{CB(1)}$ to another UE. As an example, an allocation using the frequency comb $810_{CB(0)}$ are shown as patterned boxes. Thus, a sequence-based signal (e.g., the sequences 410, 412, 510, 512, 514, and 516) may span one frequency comb $810_{CB(i)}$. Similar to the schemes 600 and 700, the sequence generation components 402 and 502 and/or the sequence generation and mapping module 208 may generate a sequence with a sequence length to match a number of frequency combs 810 or subcarriers 612 in an allocation.

Figure 9:
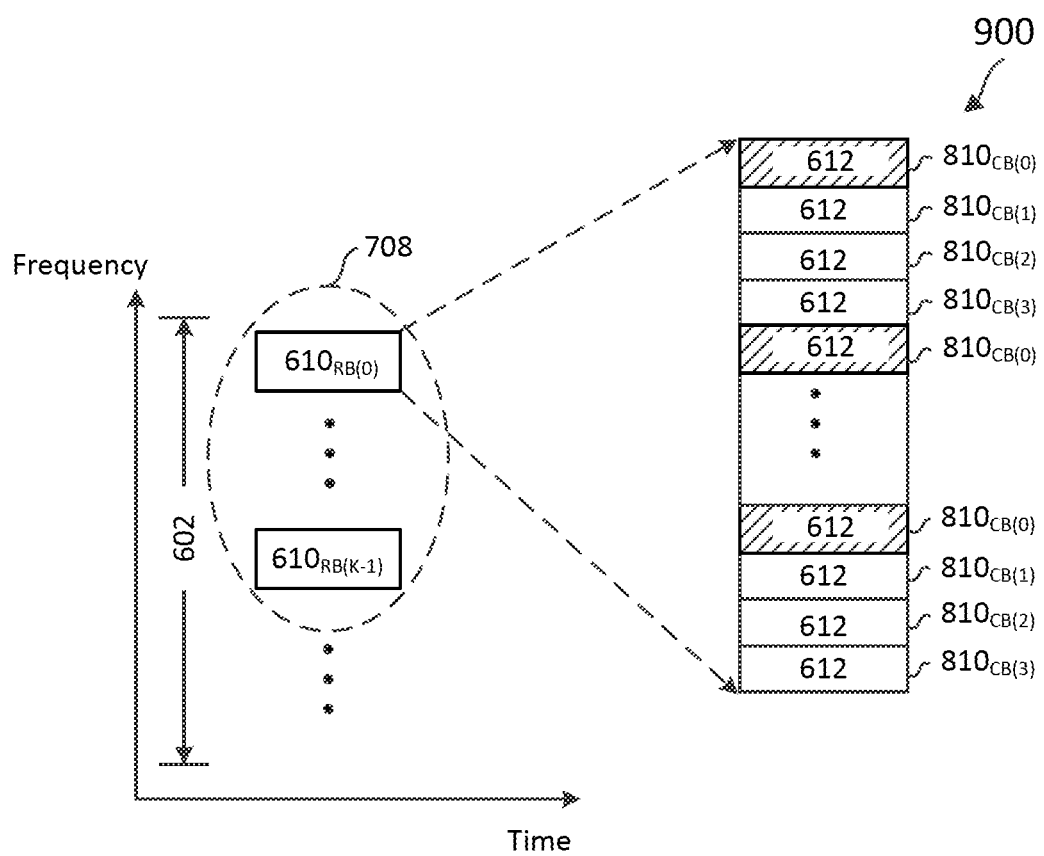
FIG. 9 illustrates a resource configuration scheme with frequency combs according to embodiments of the present disclosure.

FIG. 9 illustrates a resource configuration scheme 900 with frequency combs according to embodiments of the present disclosure. The scheme 900 may be employed by BSs such as the BSs 105 and 300 and UEs such as the UEs 115 and 200 to communicate over a frequency spectrum 602. The scheme 900 may be substantially similar to the scheme 800. However, the scheme 900 configures allocations in units of frequency combs 810 across a group 708 of K localized RBs 610 instead of K distributed RBs 610. As an example, an allocation using the frequency comb $810_{CB(0)}$ are shown as patterned boxes. Similar to the scheme 700, the scheme 900 may be suitable for use in a frequency spectrum with a sufficiently large SCS.

As can be seen, the subcarriers 612 in the scheme 900 are uniformly spaced over the entire frequency allocation for a sequence transmission. In contrast, the subcarriers 612 in the scheme 800 are uniformly spaced, locally within a RB 610, but not uniformly spaced over the entire frequency allocation for a sequence transmission. Thus, the scheme 900 may provide a lower peak-to-average power ratio (PAPR) than the scheme 800.

While the schemes 800 and 900 are illustrated with four frequency combs 810, the schemes 800 and 900 may be alternatively configured to include any suitable number of frequency combs 810. Comparing the schemes 800 and 900 to the schemes 600 and 700, the use of frequency combs 810 for allocations can allow for a greater number of UE assignments to be multiplexed over a set of K RBs 610. However, the frequency comb structure may degrade the sequence separation performance. For example, the channel response or the channel phase may vary between a first subcarrier 612 (e.g., indexed 0) and a second subcarrier 612 (e.g., indexed 4) in a frequency comb $810_{CB(0)}$. Thus, the number of frequency combs 810 within a set of K RBs 610 may be dependent on the channel property (e.g., the flatness of the channel response).

Figure 10:
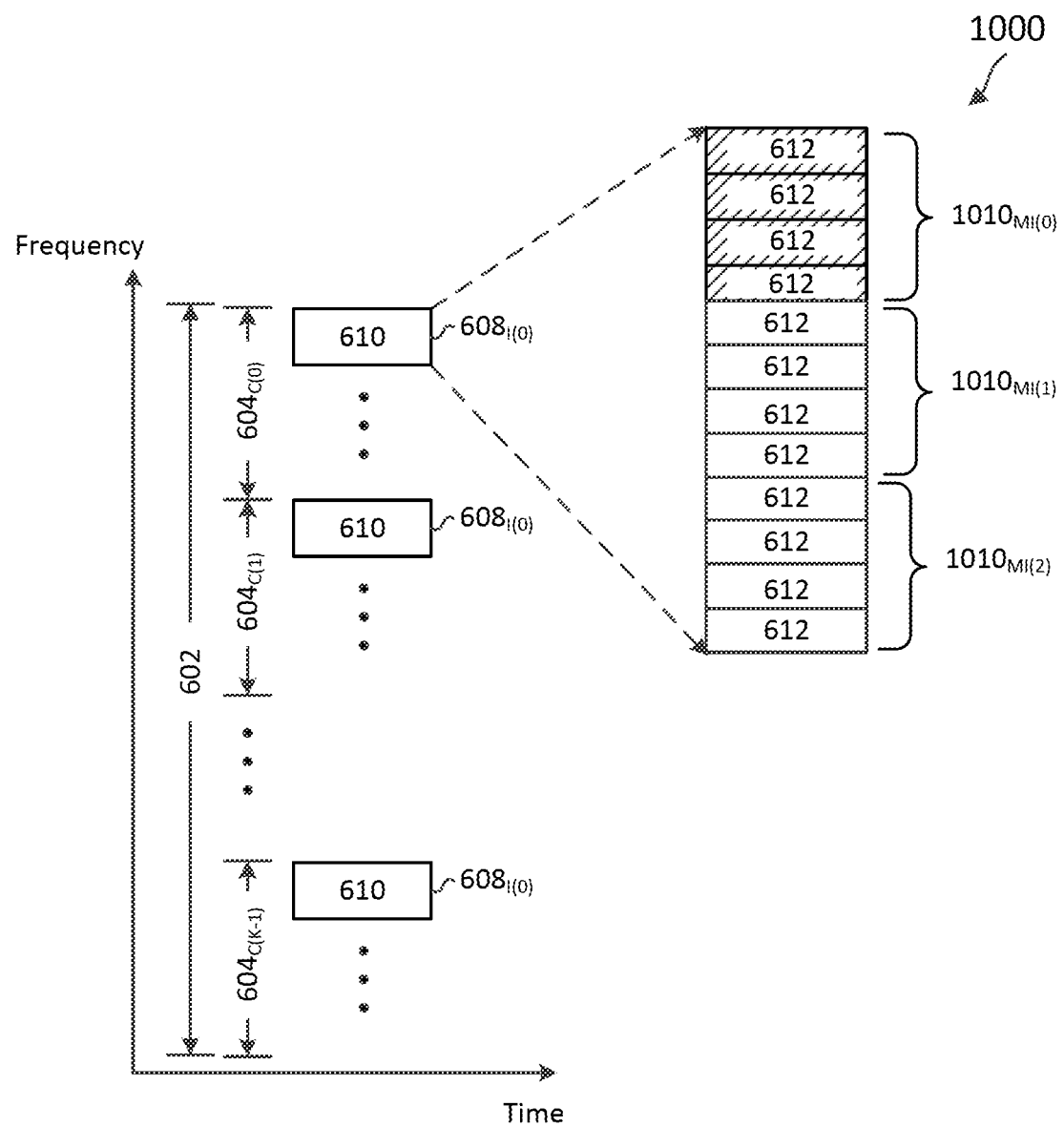
FIG. 10 illustrates a resource configuration scheme with frequency mini-interlaces according to embodiments of the present disclosure.

FIG. 10 illustrates a resource configuration scheme 1000 with frequency mini-interlaces according to embodiments of the present disclosure. The scheme 1000 may be employed by BSs such as the BSs 105 and 300 and UEs such as the UEs 115 and 200 to communicate over a frequency spectrum 602. The scheme 1000 distributes the frequency occupancy of an allocation using frequency mini-interlaces 1010 over K distributed RBs 610. The scheme 1000 partitions each RB 610 into multiple interleaving frequency mini-interlaces 1010. For example, the scheme 1000 may include four frequency mini-interlaces 1010 in a set of K distributed RBs 610.

The frequency mini-interlaces 1010 are shown as $1010_{MI(0)}$, $1010_{MI(1)}$, $1010_{MI(2)}$, and $1010_{MI(3)}$. Each frequency mini-interlace 1010 includes a plurality sets of contiguous subcarriers 612 distributed across K distributed RBs 610. Each RB 610 is divided into four sets of contiguous subcarriers 612. In other words, the plurality sets of contiguous subcarriers 612 in a particular frequency mini-interlace $1010_{MI(i)}$ are spaced apart from each other by at least one other sets of contiguous subcarrier 612, where i may vary between 0 and 2. For example, the scheme 1000 may allocate the frequency mini-interlace $1010_{MI(0)}$ to one UE and the frequency mini-interlace $1010_{MI(1)}$ to another UE. As an example, an allocation using the frequency mini-interlace $1010_{MI(0)}$ are shown as patterned boxes. Thus, a sequence-based signal (e.g., the sequences 410, 412, 510, 512, 514, and 516) may span one frequency mini-interlace 1010. Similar to the schemes 600, 700, 800, and 900, the sequence generation components 402 and 502 and/or the sequence generation and mapping module 208 may generate a sequence with a sequence length to match a number of frequency combs 810 or subcarriers 612 in an allocation.

Figure 11:
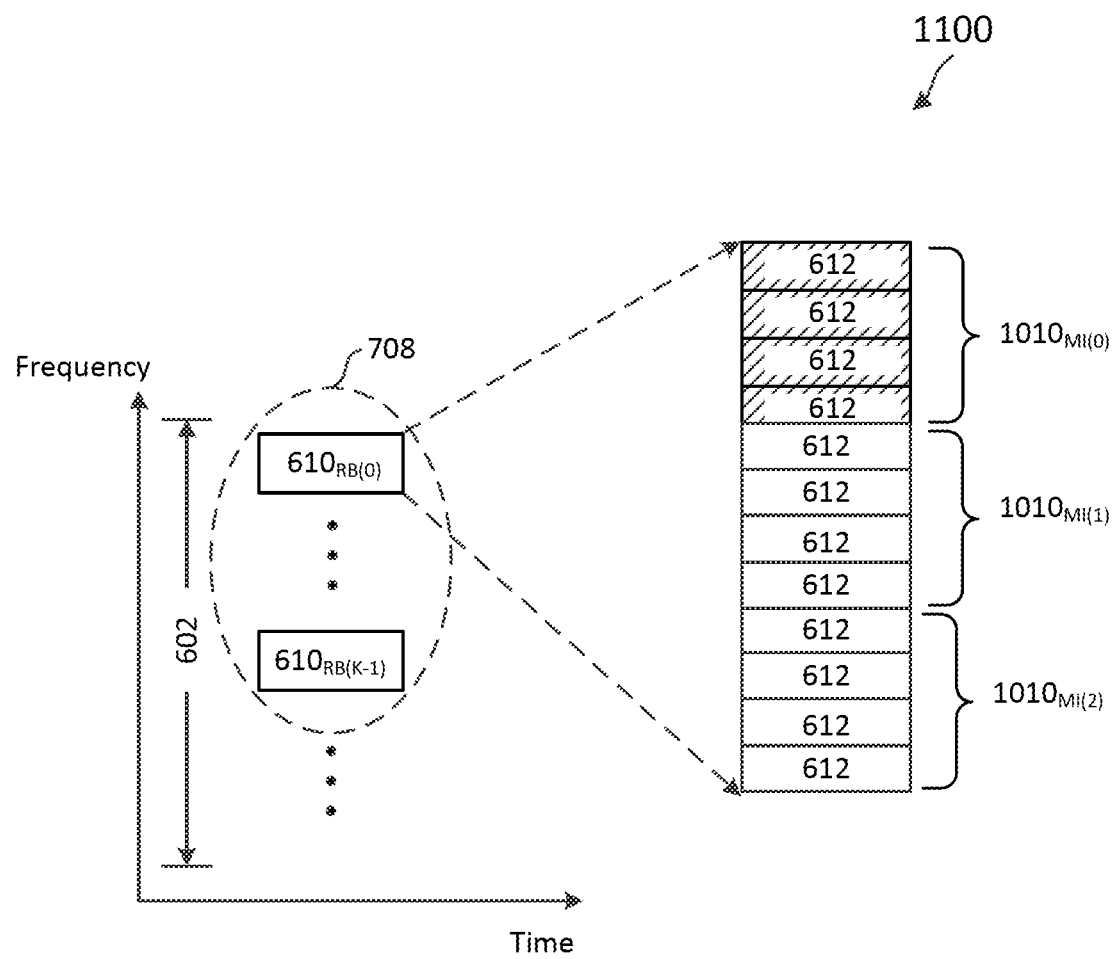
FIG. 11 illustrates a resource configuration scheme with frequency mini-interlaces according to embodiments of the present disclosure.

FIG. 11 illustrates a resource configuration scheme 1100 with frequency mini-interlaces according to embodiments of the present disclosure. The scheme 1100 may be employed by BSs such as the BSs 105 and 300 and UEs such as the UEs 115 and 200 to communicate over a frequency spectrum 602. The scheme 1100 may be substantially similar to the scheme 1000. However, the scheme 1100 configures allocations in units of frequency mini-interlace 1010 across a group 708 of K localized RBs 610 instead of K distributed RBs 610. As an example, an allocation using the frequency mini-interlace $1010_{MI(0)}$ are shown as patterned boxes. Similar to the schemes 700 and 900, the scheme 1100 may be suitable for use in a frequency spectrum with a sufficiently large SCS.

While the schemes 1000 and 1100 are illustrated with four frequency mini-interlaces 1010, the schemes 1000 and 1100 may be alternatively configured to include any suitable number of frequency mini-interlaces 1010. Comparing the schemes 1000 and 1100 to the schemes 800 and 900, the use of frequency mini-interlaces 1010 for allocations can allow for multiplexing of transmissions from different UEs over a set of K RBs while providing better sequence separation performance.

Figure 12:
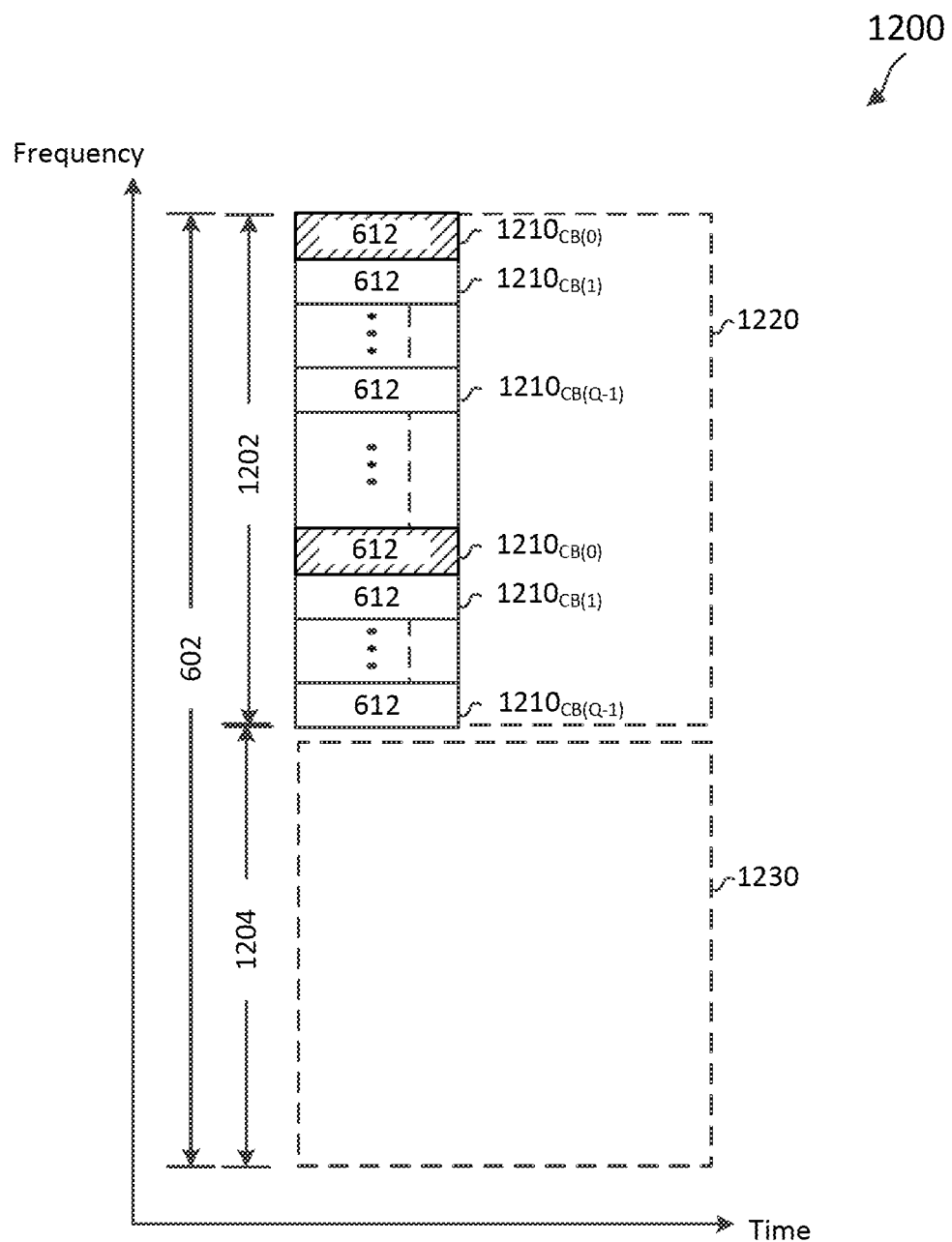
FIG. 12 illustrates an interleaved frequency-division multiplexing (IFDM)-based resource configuration scheme according to embodiments of the present disclosure.

FIG. 12 illustrates an IFDM-based resource configuration scheme 1200 according to embodiments of the present disclosure. The scheme 1200 may be employed by BSs such as the BSs 105 and 300 and UEs such as the UEs 115 and 200 to communicate over a frequency spectrum 602. The scheme 1200 may be substantially similar to the schemes 800 and 900. However, the scheme 1200 configures resource allocations in units of frequency combs 1210 across a subband 1202 in the frequency spectrum instead of across the entire frequency spectrum 602.

For example, the frequency spectrum 602 may have a bandwidth of about 100 MHz. The scheme 1200 may determine that a subband 1202 with a bandwidth of about 20 MHz is sufficient to allow a UE to transmit at full power (e.g., at about 23 dBm) while meeting an allowable PSD level in the frequency spectrum 602. The scheme 1200 may allocate Q plurality of frequency combs 1210 over the subband 1202, where Q is a positive integer. The frequency combs 1210 are shown as $1210_{CB(0)}$ to $1210_{CB(Q-1)}$. Each frequency comb $1210_{CB(i)}$ may include subcarriers 612 equally spaced across the subband 1202, where i may vary between 0 and Q-1. For example, the scheme 1200 may allocate the frequency comb $1210_{CB(0)}$ to one UE and the frequency comb $1210_{CB(1)}$ to another UE. As an example, an allocation using the frequency comb $1210_{CB(0)}$ are shown as patterned boxes. Thus, a sequence-based signal (e.g., the sequences 410, 412, 510, 512, 514, and 516) may span one frequency comb $1210_{CB(i)}$.

The scheme 1200 may multiplex other channel transmissions 1230 (e.g., data transmissions over PUSCH) in the remaining bandwidth (e.g., a subband 1204 with a bandwidth of about 80 MHz) with the occupied frequency combs 1210 using FDM. In some embodiments, a sequence-based signal may span one, two, or three OFDM symbols in time. Thus, the scheme 1200 may multiplex other channel transmissions 1220 (e.g., data transmissions over PUSCH) with the occupied frequency combs 1210 using TDM. In some embodiments, the channel transmissions 1220 and 1230 may rate match around the occupied frequency combs 1210. Rate match refers to matching the number of bits in a TB to a number of bits that can be transmitted in an allocation.

Figure 13:
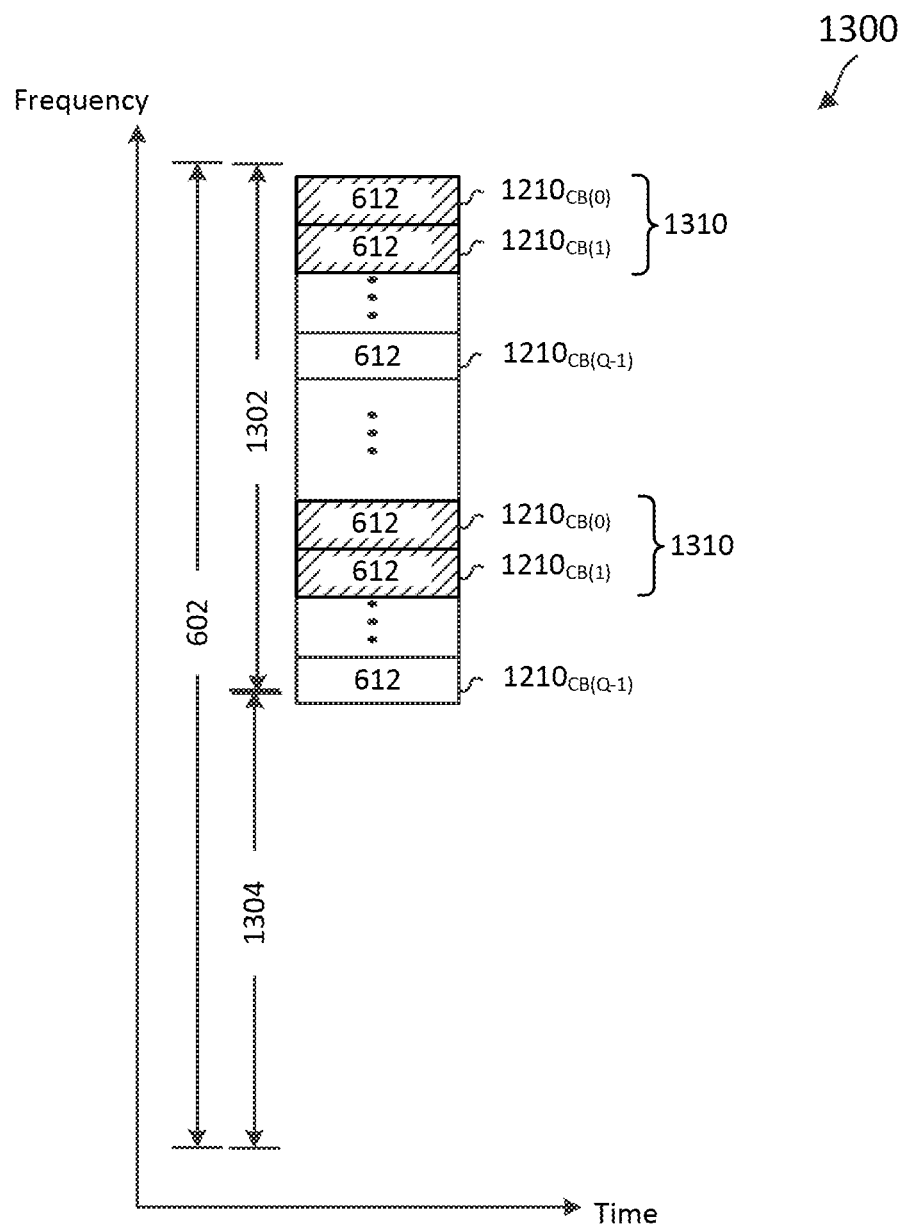
FIG. 13 illustrates a user-specific, sequence-specific resource configuration scheme according to embodiments of the present disclosure.

FIG. 13 illustrates a user-specific, sequence-specific resource configuration scheme 1300 according to embodiments of the present disclosure. The scheme 1300 may be employed by BSs such as the BSs 105 and 300 and UEs such as the UEs 115 and 200 to communicate over a frequency spectrum 602. The scheme 1300 may be substantially similar to the scheme 1200. However, the scheme 1300 configures each UE with sequence-specific frequency combs 1210.

Similar to the scheme 1200, the scheme 1300 may determine that a subband 1302 (e.g., with a bandwidth of about 20 MHz) is sufficient to meet an allowable PSD level in the frequency spectrum 602. The scheme 1300 may divide the subband 1302 into about Q plurality of frequency combs 1210, where Q is a positive integer. The scheme 1300 assigns each UE with a frequency comb set 1310 including a plurality of sequence-specific frequency combs 1210. For example, the scheme 1300 may configure one frequency comb $1210_{CB(0)}$ for a UE to transmit an ACK sequence (e.g., the sequence 410) and another frequency comb $1210_{CB(1)}$ for the UE to transmit a NAK sequence (e.g., the sequence 412).

Since the UE may transmit one sequence (e.g., an ACK or a NAK) during a particular time, at least one of the frequency comb $1210_{CB(1)}$ or $1210_{CB(1)}$ may be unoccupied. Thus, a receiver (e.g., a BS 105) may estimate channel noise based on the unoccupied frequency comb $1210_{CB(1)}$ or $1210_{CB(1)}$. In some embodiments, the receiver may compare signal energy in the frequency comb $1210_{CB(1)}$ and $1210_{CB(1)}$ to a threshold to determine whether an ACK sequence or a NAK sequence is received.

While FIG. 13 is illustrated with a frequency comb set 1310 including two adjacent frequency combs 1210, a frequency comb set 1310 may be alternatively configured to include any suitable number of frequency combs 1210. For example, a frequency comb set 1310 may include $2^N$ frequency combs 1210 for carrying N-bit information, where N is a positive integer. Similar to the scheme 1200, the scheme 1300 may multiplex other channel transmissions with the occupied frequency combs 1210 using FDM in the remaining bandwidth 1304 and/or TDM during other time period.

Figure 14:
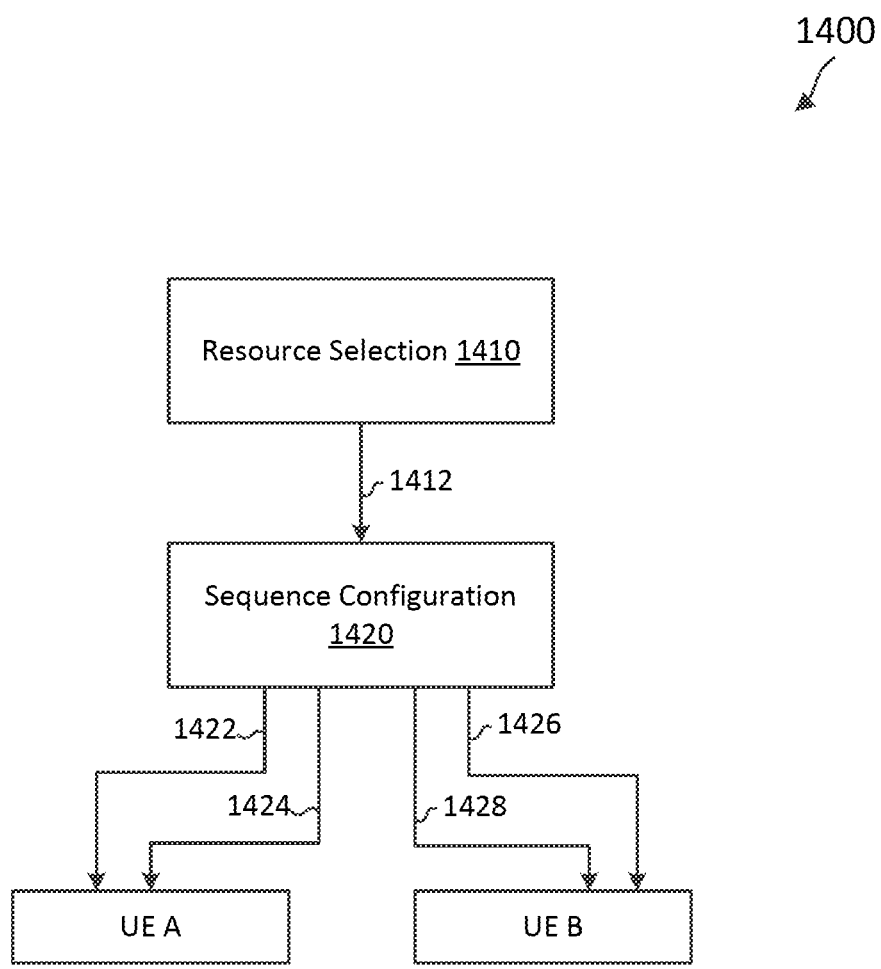
FIG. 14 illustrates a code-division multiplexing (CDM)-based resource configuration scheme according to embodiments of the present disclosure.

FIG. 14 illustrates a CDM-based resource configuration scheme 1400 according to embodiments of the present disclosure. The scheme 1400 may be employed by BSs such as the BSs 105 and 300 and UEs such as the UEs 115 and 200 to communicate over a frequency spectrum 602. The scheme 1400 may be used in conjunction with the schemes 600, 700, 800, 900, 1000, 1100, 1200, and 1300. The scheme 1400 configures multiple UEs to transmit sequence-based signals on the same resources using CDM. The scheme 1400 includes a resource selection component 1410 and a sequence configuration component 1420. For example, the resource configuration module 308 may include the resource selection component 1410 and the sequence configuration component 1420.

The resource selection component 1410 is configured to allocate a set of resources 1412 for sequence-based signal transmissions (e.g., the sequences 410, 412, 510, 512, 514, and 516). The resource selection component 1410 may assign the set of resources 1412 to multiple UEs (e.g., a UE A and a UE B). The set of resources 1412 may correspond to a frequency interlace $608_{I(i)}$, a frequency comb $810_{CB(i)}$ or $1210_{CB(i)}$, or a mini-interlace $1010_{MI(i)}$ distributed in the frequency spectrum 602 as shown in the schemes 600, 700, 800, 900, 1000, 1100, 1200, and 1300.

The sequence configuration component 1420 is configured to configure different sequences for the UE A and the UE B to indicate ACKs and NAKs. The sequence configuration component 1420 may assign the UE A with a sequence 1422 for an ACK transmission and a sequence 1424 for a NAK transmission. The sequence configuration component 1420 may assign the UE B with a sequence 1426 for an ACK transmission and a sequence 1428 for a NAK transmission. The sequence configuration component 1420 may select the sequences 1422, 1424, 1426, and 1428 to provide a maximum sequence separation. For example, the sequences 1422, 1424, 1426, and 1428 may be orthogonal sequences.

Subsequently, the UE A may transmit the sequence 1422 or 1424 and the UE B may transmit the sequence 1426 or 1428 using the same set of resources 1412 at the same time.

Figure 15:
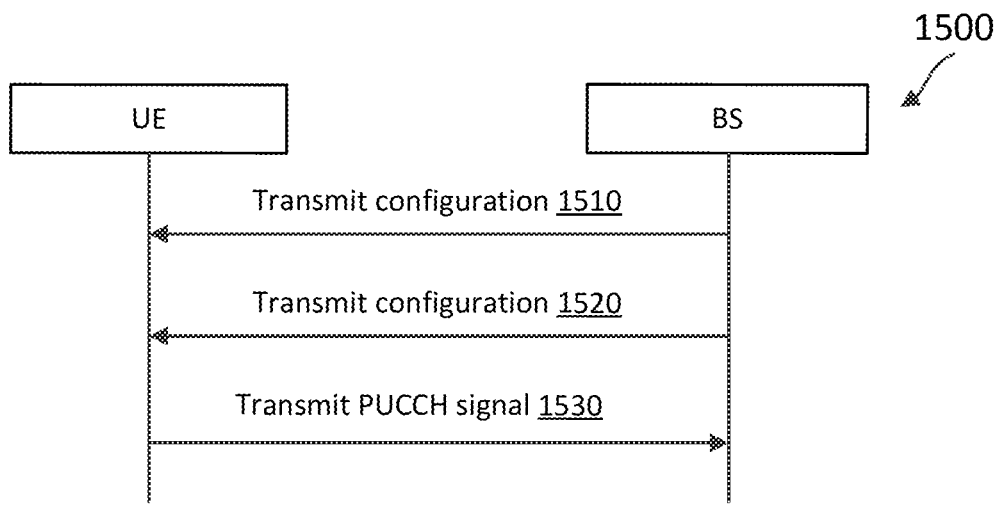
FIG. 15 is a signaling diagram of an uplink control communication method according to embodiments of the present disclosure.

FIG. 15 is a signaling diagram of an uplink control communication method 1500 according to embodiments of the present disclosure. The method 1500 is implemented among a BS and a UE. The BS may be similar to the BSs 105 and 300. The UE may be similar to the UEs 115 and 200. Steps of the method 1500 can be executed by computing devices (e.g., a processor, processing circuit, and/or other suitable component) of the BS and the UE. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the BS transmits a configuration to the UE. The configuration may indicate resources in a frequency spectrum (e.g., the frequency spectrum 602) allocated to the UE. The resources may have a frequency distribution granularity of a frequency interlace $608_{I(i)}$, a frequency comb $810_{CB(i)}$ or $1210_{CB(i)}$, or a frequency mini-interlace $1010_{MI(i)}$. Alternatively, when the SCS in the frequency spectrum is sufficiently large, the resources may span contiguous frequencies instead of distributed over a bandwidth.

The BS may assign the resources based on a PSD parameter of the frequency spectrum, a transmit power headroom or a transmit power utilization factor (e.g., a transmit power limit) of the UE, channel coherency, sequence separation, and/or a numerology (e.g., an SCS) used for communicating with the UE. In addition, the configuration may indicate sequences assigned to the UE or information for the UE to generate specific sequences. The sequences may be used for feedback transmissions to indicate ACKs and/or NAKs (e.g., the sequences 410, 412, 510, 512, 514, and 516).

At step 1520, the BS may transmit a data signal (e.g., carrying one or more TBs) designated to the UE.

At step 1530, the UE may transmit a PUCCH signal carrying a feedback for the reception of the data signal based on the configuration. For example, the UE may select a sequence from the assigned sequences and transmit the sequence using the resources.

In an embodiment, the BS may semi-statically configure a UE with K number of RBs (e.g., the RBs 610) and dynamically assign a frequency distribution mode (e.g., a frequency interlace $608_{I(i)}$, a frequency comb $810_{CB(i)}$ or $1210_{CB(i)}$, or a mini-interlaces $1010_{MI(i)}$) to the UE at run time. In another embodiment, the BS may semi-statically configure a UE with multiple sets of resources and frequency distribution modes and dynamically assign one of the configured resources and frequency distributions modes during run time, for example, based on scheduling among multiple UEs. The configuration may be carried in a RRC message and/or in a physical downlink control channel (PDCCH) signal. In the LTE context, a PDCCH signal may carry DL resource assignment and scheduling information for a TTI, which may be subframe or a slot. The PDCCH signal may be transmitted at a beginning portion of the TTI.

Figure 16:
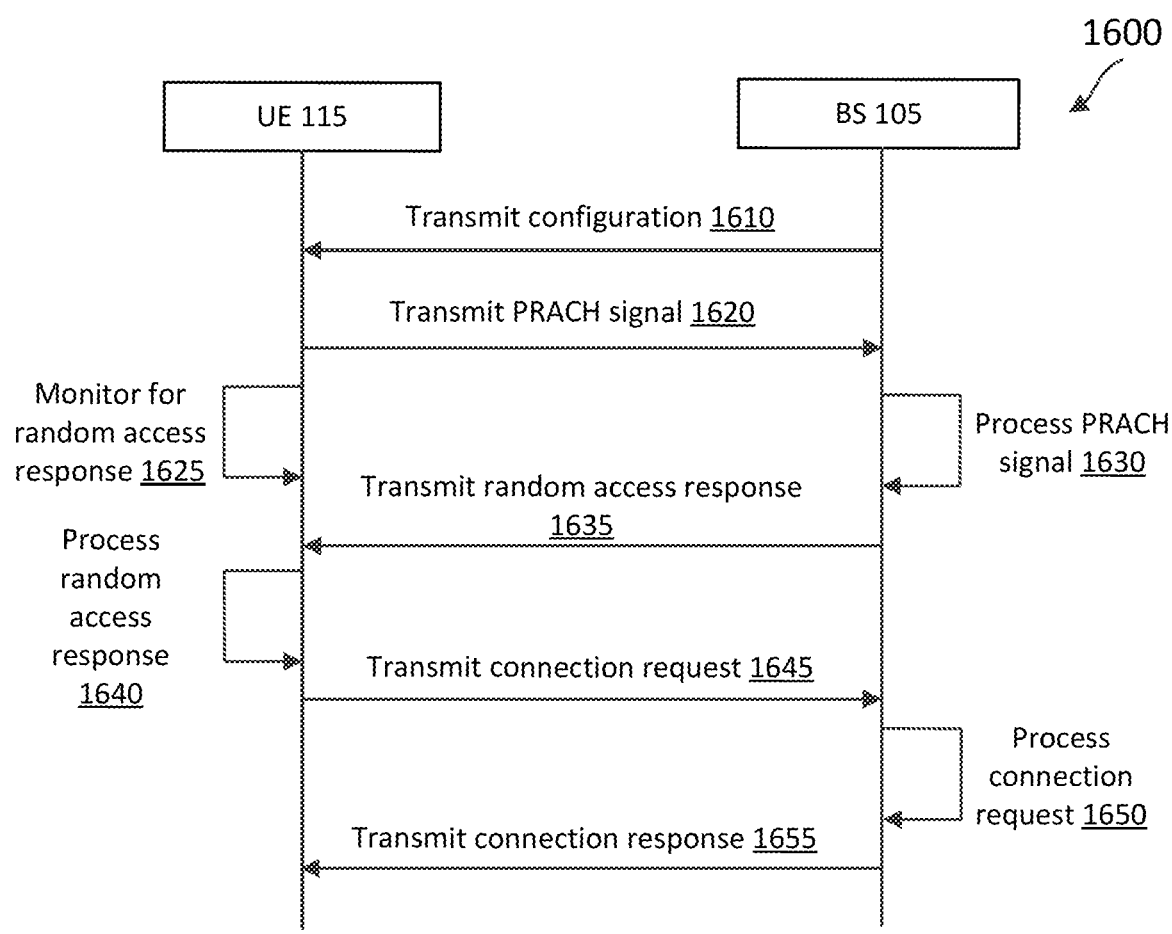
FIG. 16 is a signaling diagram of a network random access method according to embodiments of the present disclosure.

FIG. 16 is a signaling diagram of a network random access method 1600 according to embodiments of the present disclosure. The method 1600 is implemented among a BS and a UE. The BS may be similar to the BSs 105 and 300. The UE may be similar to the UEs 115 and 200. Steps of the method 1600 can be executed by computing devices (e.g., a processor, processing circuit, and/or other suitable component) of the BS and the UE. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the BS transmits a configuration in a network (e.g., the network 100). In some embodiments, the BS may broadcast the configuration in a SIB. The configuration may indicate random access resources in a frequency spectrum (e.g., the frequency spectrum 602). The resources may have a frequency distribution granularity of a frequency interlace $608_{I(i)}$, a frequency comb $810_{CB(i)}$ or $1210_{CB(i)}$, or a frequency mini-interlace $1010_{MI(i)}$. Alternatively, when the SCS in the frequency spectrum is sufficiently large, the resources may span contiguous frequencies instead of distributed over a bandwidth. The BS may assign the resources based on a PSD parameter of the frequency spectrum, a transmit power limit of the UE, channel coherency, sequence separation, and/or a numerology (e.g., an SCS) used for communicating with the UE. In addition, the configuration may indicate random access sequences or information for generating random access sequences. In some embodiments, certain random access sequences may be transmitted on certain resources.

At step 1620, the UE may transmit a PRACH signal based on the configuration to initiate an access to the network. For example, the UE may select a resource from the resources based on the UE's transmit power capability. The PRACH signal may carry a random access sequence scrambled or coded with a random access signature. For example, depending on the selection, the PRACH signal may span a frequency interlace $608_{I(i)}$, a frequency comb $810_{CB(i)}$ or $1210_{CB(i)}$, or a frequency mini-interlace $1010_{MI(i)}$ distributed across K equally spaced RBs 610, K contiguous RBs 610, or a subband 1202 or 1302. Alternatively, the PRACH signal may span contiguous subcarriers in K contiguous RBs 610.

At step 1625, after transmitting the PRACH signal, the UE may monitor for a random access response.

At step 1630, upon detecting the PRACH signal, the BS processes the PRACH signal. For example, the BS may monitor for a PRACH signal in the resources indicated in the configuration and based on the sequences indicated in the configuration. The BS may determine uplink transmission timing of the UE and assign a UL resource and a temporary identifier (ID) to the UE for sending a subsequent message based on the received PRACH signal. The UL resource may or may not be distributed over the frequency spectrum as shown in the schemes 600-1300 described above. The BS may identify a next message (e.g., a connection request) from the UE by the temporary ID.

At step 1635, the BS transmits a random access response indicating the timing advance information, the resource, and the temporary ID.

At step 1640, upon receiving the random access response, the UE processes the random access response. The UE may obtain information associated with the UL resource, the temporary ID, and the timing advance information from the random access response. At step 1645, the UE transmits a connection request to the BS based on the UL resource, the temporary ID, and the timing advance information.

At step 1650, upon receiving the connection request, the BS processes the connection request. At step 1655, the BS acknowledges the connection request by transmitting a connection response to the UE.

In the context of LTE, the random access signature is referred to as a random access-radio network temporary identifier (RA-RNTI). The temporary ID is referred to as a temporary cell-radio network temporary identifier (C-RNTI). The PRACH signal, the random access response, the connection request, and the connection response are referred to as message 1, message 2, message 3, and message 4, respectively.

Figure 17:
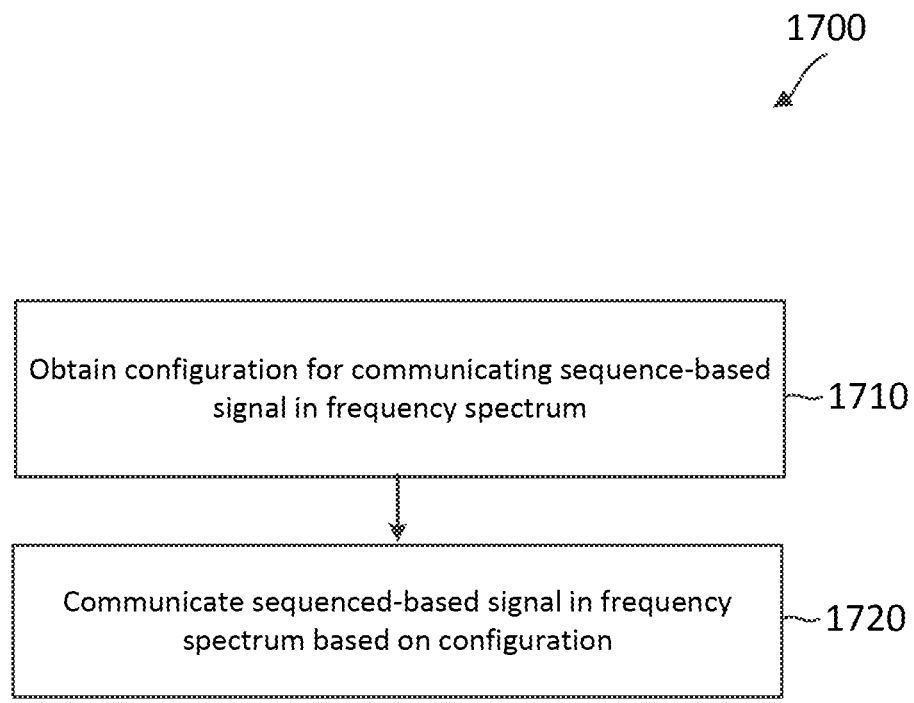
FIG. 17 is a flow diagram of a sequence-based communication method according to embodiments of the present disclosure.

FIG. 17 is a flow diagram of a sequence-based communication method 1700 according to embodiments of the present disclosure. Steps of the method 1700 can be executed by a computing device (e.g., a processor, processing circuit, and/or other suitable component) of a wireless communication device, such as the BSs 105 and 300 and the UEs 115 and 200. The method 1700 may employ similar mechanisms as in the schemes 600, 700, 800, 900, 1000, 1100, 1200, 1300, and 1400 and the methods 1500 and 1600 described with respect to FIGS. 6, 7, 8, 9, 10, 11, 12, 13, 14, 15, and 16, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes obtaining, by a first wireless communication device, a configuration for communicating a sequence-based signal in a frequency spectrum. The sequence-based signal may be a PUCCH signal carrying a sequence similar to the sequences 410, 412, 510, 512, 514, and 516 or a PRACH signal carrying a random access preamble. The frequency spectrum may be similar to the frequency spectrum 602.

The configuration indicates resources in the frequency spectrum and a frequency distribution mode of the resources. In an embodiment, the resources may include a plurality of sets of contiguous subcarriers (e.g., the subcarriers 612) spaced apart from each other by at least one other set of contiguous subcarriers. For example, the resources may be similar to a frequency interlace $608_{I(i)}$, where each set of contiguous subcarriers of the plurality of sets of contiguous subcarriers corresponds to a RB (e.g., the RB 610) in the frequency spectrum. Alternatively, the resources may be similar to a frequency mini-interlace $1010_{MI(i)}$, where each set of contiguous subcarriers of the plurality of sets of contiguous subcarriers corresponds to a portion of one of a plurality of RBs next to each other in the frequency spectrum or distributed across the frequency spectrum.

In another embodiment, the resources may include a plurality of subcarriers spaced apart from each other by at least one other subcarrier in the frequency spectrum. For example, the resources may be similar to a frequency comb $810_{CB(i)}$, where the plurality of subcarriers is within a plurality of RBs next to each other in the frequency spectrum or distributed across the frequency spectrum. Alternatively, the resources may be similar to a frequency comb $1210_{CB(i)}$, where the plurality of subcarriers is within a portion (e.g., the subband 1202 or 1302) of the frequency spectrum based on a PSD parameter of the frequency spectrum. In an embodiment, the resources may correspond to K contiguous RBs (e.g., the RBs 610). In some embodiments, the resources may be UE-specific. In some embodiments, the resources may be UE-specific and sequence-specific. In some embodiments, the resources may be used by multiple UEs for transmissions based on CDM.

At step 1720, the method 1700 includes communicating, by the first wireless communication device with a second wireless communication device, the sequence-based signal in the frequency spectrum based on the configuration.

In an embodiment, the first wireless communication device may be a BS 105. In such an embodiment, the obtaining may include assigning the resources and the frequency distribution mode to the second wireless communication device based on at least one of a parameter of the frequency spectrum, a transmit power utilization factor of the second wireless communication device, or a subcarrier spacing used for communicating between the first wireless communication device and the second wireless communication device. After assigning the resources, the first wireless communication device may transmit the configuration to the second wireless communication device. The communicating may include receiving, by the first wireless communication from the second wireless communication device, the sequence-based signal.

In another embodiment, the first wireless communication device may be a UE 115. In such an embodiment, the obtaining may include receiving by the first wireless communication from the second wireless communication device, the configuration. The communicating may include transmitting, by the first wireless communication to the second wireless communication device, the sequence-based signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising obtaining, by a first wireless communication device, a configuration for communicating a sequence-based signal in a frequency spectrum, the configuration indicating resources in the frequency spectrum and a frequency distribution mode of the resources; and communicating, by the first wireless communication device with a second wireless communication device, the sequence-based signal in the frequency spectrum based on the configuration.

In some embodiments, wherein the obtaining includes assigning the resources and the frequency distribution mode to the second wireless communication device based on at least a power spectrum density (PSD) parameter of the frequency spectrum. In some embodiments, wherein the obtaining includes assigning the resources and the frequency distribution mode to the second wireless communication device based on at least a transmit power utilization factor of the second wireless communication device. In some embodiments, wherein the obtaining includes assigning the resources and the frequency distribution mode to the second wireless communication device based on at least a subcarrier spacing used for communicating between the first wireless communication device and the second wireless communication device. In some embodiments, wherein the obtaining includes assigning the resources and the frequency distribution mode to the second wireless communication device based on at least a transmit power headroom of the second wireless communication device. In some embodiments, wherein the communicating includes communicating a physical uplink control channel (PUCCH) signal including a sequence using the resources. In some embodiments, wherein the communicating includes communicating a physical random access channel (PRACH) signal including a sequence using the resources. In some embodiments, the method further comprises transmitting, by the first wireless communication device to the second wireless communication device, the configuration, wherein the communicating includes receiving, by the first wireless communication device from the second wireless communication device, the sequence-based signal. In some embodiments, wherein the obtaining includes receiving, by the first wireless communication device from the second wireless communication device, the configuration, and wherein the communicating includes transmitting, by the first wireless communication device to the second wireless communication device, the sequence-based signal. In some embodiments, wherein the communicating is based on a code-division multiplexing with another sequence-based signal transmitted by a third wireless communication device using the same resources. In some embodiments, wherein the resources include a plurality of sets of contiguous subcarriers spaced apart from each other by at least one other set of contiguous subcarriers. In some embodiments, wherein each set of contiguous subcarriers of the plurality of sets of contiguous subcarriers corresponds to a resource block in the frequency spectrum. In some embodiments, wherein each set of contiguous subcarriers of the plurality of sets of contiguous subcarriers corresponds to a portion of one of a plurality of resource blocks distributed across the frequency spectrum. In some embodiments, wherein each set of contiguous subcarriers of the plurality of sets of contiguous subcarriers corresponds to a portion of one of a plurality of contiguous resource blocks in the frequency spectrum. In some embodiments, wherein the resources includes a plurality of subcarriers spaced apart from each other by at least one other subcarrier in the frequency spectrum. In some embodiments, wherein the plurality of subcarriers is within a plurality of resource blocks distributed across the frequency spectrum. In some embodiments, wherein the plurality of subcarriers is within a plurality of contiguous resource blocks in the frequency spectrum. In some embodiments, wherein the plurality of subcarriers is within a portion of the frequency spectrum based on a power spectral density (PSD) parameter of the frequency spectrum. In some embodiments, wherein the resources includes another plurality of subcarriers interlaces with the plurality of subcarriers in the portion of the frequency spectrum, wherein the plurality of subcarriers is for communicating first information in the frequency spectrum, wherein the another plurality of subcarriers is for communicating second information in the frequency spectrum, and wherein the communicating includes communicating a first sequence representing the first information using the plurality of subcarriers; or communicating a second sequence representing the second information using the another plurality of subcarriers.

Further embodiments of the present disclosure include an apparatus comprising a processor configured to obtain a configuration for communicating a sequence-based signal in a frequency spectrum, the configuration indicating resources in the frequency spectrum and a frequency distribution mode of the resources; and a transceiver configured to communicate, with a second wireless communication device, the sequence-based signal in the frequency spectrum based on the configuration.

In embodiments, wherein the processor is further configured to obtain the configuration by assigning the resources and the frequency distribution mode to the second wireless communication device based on at least a power spectrum density (PSD) parameter of the frequency spectrum. In some embodiments, wherein the processor is further configured to obtain the configuration by assigning the resources and the frequency distribution mode to the second wireless communication device based on at least a transmit power utilization factor of the second wireless communication device. In some embodiments, wherein the processor is further configured to obtain the configuration by assigning the resources and the frequency distribution mode to the second wireless communication device based on at least a subcarrier spacing used for communicating between the apparatus and the second wireless communication device. In some embodiments, wherein the processor is further configured to obtain the configuration by assigning the resources and the frequency distribution mode to the second wireless communication device based on at least a transmit power headroom of the second wireless communication device. In some embodiments, wherein the transceiver is further configured to communicate the sequence-based signal by communicating a physical uplink control channel (PUCCH) signal including a sequence using the resources. In some embodiments, wherein the transceiver is further configured to communicate the sequence-based signal by communicating a physical random access channel (PRACH) signal including a sequence using the resources. In some embodiments, wherein the transceiver is further configure to transmit, to the second wireless communication device, the configuration; and communicate the sequence-based signal by receiving, from the second wireless communication device, the sequence-based signal. In some embodiments, wherein the processor is further configured to obtain the configuration by receiving, from the second wireless communication device via the transceiver, the configuration, and wherein the transceiver is further configured to communicate the sequence-based signal by transmitting, to the second wireless communication device, the sequence-based signal. In some embodiments, wherein the transceiver is further configured to communicate the sequence-based signal based on a code-division multiplexing with another sequence-based signal transmitted by a third wireless communication device using the same resources. In some embodiments, wherein the resources include a plurality of sets of contiguous subcarriers spaced apart from each other by at least one other set of contiguous subcarriers. In some embodiments, wherein each set of contiguous subcarriers of the plurality of sets of contiguous subcarriers corresponds to a resource block in the frequency spectrum. In some embodiments, wherein each set of contiguous subcarriers of the plurality of sets of contiguous subcarriers corresponds to a portion of one of a plurality of resource blocks distributed across the frequency spectrum. In some embodiments, wherein each set of contiguous subcarriers of the plurality of sets of contiguous subcarriers corresponds to a portion of one of a plurality of contiguous resource blocks in the frequency spectrum. In some embodiments, wherein the resources includes a plurality of subcarriers spaced apart from each other by at least one other subcarrier in the frequency spectrum. In some embodiments, wherein the plurality of subcarriers is within a plurality of resource blocks distributed across the frequency spectrum. In some embodiments, wherein the plurality of subcarriers is within a plurality of contiguous resource blocks in the frequency spectrum. In some embodiments, wherein the plurality of subcarriers is within a portion of the frequency spectrum based on a power spectral density (PSD) parameter of the frequency spectrum.

In some embodiments, wherein the resources includes another plurality of subcarriers interlaces with the plurality of subcarriers in the portion of the frequency spectrum, wherein the plurality of subcarriers is for communicating first information in the frequency spectrum, wherein the another plurality of subcarriers is for communicating second information in the frequency spectrum, and wherein the transceiver is further configured to communicate the sequence-based signal by communicating a first sequence representing the first information using the plurality of subcarriers; or communicating a second sequence representing the second information using the another plurality of subcarriers.

Further embodiments of the present disclosure include a computer-readable medium having program code recorded thereon, the program code comprising code for causing a first wireless communication device to a configuration for communicating a sequence-based signal in a frequency spectrum, the configuration indicating resources in the frequency spectrum and a frequency distribution mode of the resources; and code for causing the first wireless communication device to communicate, with a second wireless communication device in the frequency spectrum based on the configuration, the sequence-based signal.

In some embodiments, wherein the code for causing the first wireless communication device to obtain the configuration is further configured to assign the resources and the frequency distribution mode to the second wireless communication device based on at least a power spectrum density (PSD) parameter of the frequency spectrum. In some embodiments, wherein the code for causing the first wireless communication device to obtain the configuration is further configured to assign the resources and the frequency distribution mode to the second wireless communication device based on at least a transmit power utilization factor of the second wireless communication device. In some embodiments, wherein the code for causing the first wireless communication device to obtain the configuration is further configured to assign the resources and the frequency distribution mode to the second wireless communication device based on at least a subcarrier spacing used for communicating between the first wireless communication device and the second wireless communication device. In some embodiments, wherein the code for causing the first wireless communication device to obtain the configuration is further configured to assign the resources and the frequency distribution mode to the second wireless communication device based on at least a transmit power headroom of the second wireless communication device. In some embodiments, wherein the code for causing the first wireless communication device to communicate the sequence-based signal is further configured to communicate a physical uplink control channel (PUCCH) signal including a sequence using the resources. In some embodiments, wherein the code for causing the first wireless communication device to communicate the sequence-based signal is further configured to communicate a physical random access channel (PRACH) signal including a sequence using the resources. In some embodiments, the computer-readable medium further comprises code for causing the first wireless communication device to transmit, to the second wireless communication device, the configuration, wherein the code for causing the first wireless communication device to communicate the sequence-based signal is further configured to receive, from the second wireless communication device, the sequence-based signal. In some embodiments, wherein the code for causing the first wireless communication device to obtain the configuration is further configured to receive, from the second wireless communication device, the configuration, and wherein the code for causing the first wireless communication device to communicate the sequence-based signal is further configured to transmit, to the second wireless communication device, the sequence-based signal. In some embodiments, wherein the code for causing the first wireless communication device to communicate the sequence-based signal is further configured to communicate the sequence-based signal based on a code-division multiplexing with another sequence-based signal transmitted by a third wireless communication device using the same resources. In some embodiments, wherein the resources include a plurality of sets of contiguous subcarriers spaced apart from each other by at least one other set of contiguous subcarriers. In some embodiments, wherein each set of contiguous subcarriers of the plurality of sets of contiguous subcarriers corresponds to a resource block in the frequency spectrum. In some embodiments, wherein each set of contiguous subcarriers of the plurality of sets of contiguous subcarriers corresponds to a portion of one of a plurality of resource blocks distributed across the frequency spectrum. In some embodiments, wherein each set of contiguous subcarriers of the plurality of sets of contiguous subcarriers corresponds to a portion of one of a plurality of contiguous resource blocks in the frequency spectrum. In some embodiments, wherein the resources includes a plurality of subcarriers spaced apart from each other by at least one other subcarrier in the frequency spectrum. In some embodiments, wherein the plurality of subcarriers is within a plurality of resource blocks distributed across the frequency spectrum. In some embodiments, wherein the plurality of subcarriers is within a plurality of contiguous resource blocks in the frequency spectrum. In some embodiments, wherein the plurality of subcarriers is within a portion of the frequency spectrum based on a power spectral density (PSD) parameter of the frequency spectrum. In some embodiments, wherein the resources includes another plurality of subcarriers interlaces with the plurality of subcarriers in the portion of the frequency spectrum, wherein the plurality of subcarriers is for communicating first information in the frequency spectrum, wherein the another plurality of subcarriers is for communicating second information in the frequency spectrum, and wherein the code for causing the first wireless communication device to communicate the sequence-based signal is further configured to communicate a first sequence representing the first information using the plurality of subcarriers; or communicate a second sequence representing the second information using the another plurality of subcarriers.

Further embodiments of the present disclosure include an apparatus comprising means for obtaining a configuration for communicating a sequence-based signal in a frequency spectrum, the configuration indicates resources in the frequency spectrum and a frequency distribution mode of the resources; and means for communicating, with a second wireless communication device in the frequency spectrum based on the configuration, the sequence-based signal.

In some embodiments, wherein the means for obtaining the configuration is further configured to assign the resources and the frequency distribution mode to the second wireless communication device based on at least a power spectrum density (PSD) parameter of the frequency spectrum. In some embodiments, wherein the means for obtaining the configuration is further configured to assign the resources and the frequency distribution mode to the second wireless communication device based on at least a transmit power utilization factor of the second wireless communication device. In some embodiments, wherein the means for obtaining the configuration is further configured to assign the resources and the frequency distribution mode to the second wireless communication device based on at least a subcarrier spacing used for communicating between the apparatus and the second wireless communication device. In some embodiments, wherein the means for obtaining the configuration is further configured to assign the resources and the frequency distribution mode to the second wireless communication device based on at least a transmit power headroom of the second wireless communication device. In some embodiments, wherein the means for communicating the sequence-based signal is further configured to communicate a physical uplink control channel (PUCCH) signal including a sequence using the resources. In some embodiments, wherein the means for communicating the sequence-based signal is further configured to communicate a physical random access channel (PRACH) signal including a sequence using the resources. In some embodiments, the apparatus further comprises means for transmitting, to the second wireless communication device, the configuration, wherein the means for communicating the sequence-based signal is further configured to receive, from the second wireless communication device, the sequence-based signal. In some embodiments, wherein the means for obtaining the configuration is further configured to receive, from the second wireless communication device, the configuration, and wherein the means for communicating the sequence-based signal is further configured to transmit, to the second wireless communication device, the sequence-based signal. In some embodiments, wherein the means for communicating the sequence-based signal is further configured to communicate the sequence-based signal based on a code-division multiplexing with another sequence-based signal transmitted by a third wireless communication device using the same resources. In some embodiments, wherein the resources include a plurality of sets of contiguous subcarriers spaced apart from each other by at least one other set of contiguous subcarriers. In some embodiments, wherein each set of contiguous subcarriers of the plurality of sets of contiguous subcarriers corresponds to a resource block in the frequency spectrum. In some embodiments, wherein each set of contiguous subcarriers of the plurality of sets of contiguous subcarriers corresponds to a portion of one of a plurality of resource blocks distributed across the frequency spectrum. In some embodiments, wherein each set of contiguous subcarriers of the plurality of sets of contiguous subcarriers corresponds to a portion of one of a plurality of contiguous resource blocks in the frequency spectrum. In some embodiments, wherein the resources includes a plurality of subcarriers spaced apart from each other by at least one other subcarrier in the frequency spectrum. In some embodiments, wherein the plurality of subcarriers is within a plurality of resource blocks distributed across the frequency spectrum. In some embodiments, wherein the plurality of subcarriers is within a plurality of contiguous resource blocks in the frequency spectrum. In some embodiments, wherein the plurality of subcarriers is within a portion of the frequency spectrum based on a power spectral density (PSD) parameter of the frequency spectrum. In some embodiments, wherein the resources includes another plurality of subcarriers interlaces with the plurality of subcarriers in the portion of the frequency spectrum, wherein the plurality of subcarriers is for communicating first information in the frequency spectrum, wherein the another plurality of subcarriers is for communicating second information in the frequency spectrum, and wherein the means for communicating the sequence-based signal is further configured to communicate a first sequence representing the first information using the plurality of subcarriers; or communicate a second sequence representing the second information using the another plurality of subcarriers.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   selecting, by a first wireless communication device, a first set of resources from multiple sets of resources based on a transmission parameter, wherein resources in each set of the multiple sets of resources are spaced apart from each other by at least one other resource in a frequency spectrum, and wherein a resource in the first set of resources and a resource in a second set of resources of the multiple sets of resources include different number of subcarriers; and
   communicating, by the first wireless communication device with a second wireless communication device, a sequence-based signal in the first set of resources.

2. The method of claim 1, wherein the selecting is based on the transmission parameter including at least one of:
   a power spectrum density (PSD) parameter of the frequency spectrum;
   a transmit power utilization factor of the second wireless communication device;
   a subcarrier spacing used for communicating between the first wireless communication device and the second wireless communication device; or
   a transmit power headroom of the second wireless communication device.

3. The method of claim 1, wherein the communicating includes communicating at least one of:
   a physical uplink control channel (PUCCH) signal including a sequence using the first set of resources; or
   a physical random access channel (PRACH) signal including a sequence using the first set of resources.

4. The method of claim 1, further comprising communicating, by the first wireless communication device with the second wireless communication device, a configuration indicating the first set of resources.

5. The method of claim 1, further comprising communicating, by the first wireless communication device with the second wireless communication device, a configuration indicating the multiple sets of resources.

6. The method of claim 1, wherein the communicating is based on a code-division multiplexing with another sequence-based signal transmitted by a third wireless communication device using the same first set of resources.

7. The method of claim 1, wherein the first set of resources include a plurality of sets of contiguous subcarriers spaced apart from each other by at least one other set of contiguous subcarriers.

8. The method of claim 7, wherein each set of contiguous subcarriers of the plurality of sets of contiguous subcarriers corresponds to at least one of:

a resource block in the frequency spectrum;
a portion of one of a plurality of resource blocks distributed across the frequency spectrum; or
a portion of one of a plurality of contiguous resource blocks in the frequency spectrum.

9. The method of claim 1, wherein the first set of resources include a plurality of subcarriers spaced apart from each other by at least one other subcarrier in the frequency spectrum.

10. The method of claim 9, wherein the plurality of subcarriers is within at least one of:
a plurality of resource blocks distributed across the frequency spectrum; or
a plurality of contiguous resource blocks in the frequency spectrum.

11. The method of claim 9, wherein the plurality of subcarriers is within a portion of the frequency spectrum based on a power spectral density (PSD) parameter of the frequency spectrum.

12. The method of claim 9, wherein the first set of resources include another plurality of subcarriers interlaces with the plurality of subcarriers in the frequency spectrum, wherein the plurality of subcarriers is for communicating first information in the frequency spectrum, wherein the another plurality of subcarriers is for communicating second information in the frequency spectrum, and wherein the communicating includes:
communicating a first sequence representing the first information using the plurality of subcarriers; or
communicating a second sequence representing the second information using the another plurality of subcarriers.

13. An apparatus comprising:
a processor configured to select a first set of resources from multiple sets of resources based on a transmission parameter, wherein resources in each set of the multiple sets of resources are spaced apart from each other by at least one other resource in a frequency spectrum, and wherein a resource in the first set of resources and a resource in a second set of resources of the multiple sets of resources include different number of subcarriers; and
a transceiver configured to communicate, with a second wireless communication device, a sequence-based signal in the first set of resources.

14. The apparatus of claim 13, wherein the transmission parameter includes at least one of:
a power spectrum density (PSD) parameter of the frequency spectrum;
a transmit power utilization factor of the second wireless communication device;
a subcarrier spacing used for communicating between the apparatus and the second wireless communication device; or
a transmit power headroom of the second wireless communication device.

15. The apparatus of claim 13, wherein the transceiver is further configured to communicate the sequence-based signal by communicating at least one of:
a physical uplink control channel (PUCCH) signal including a sequence using the first set of resources; or
a physical random access channel (PRACH) signal including a sequence using the first set of resources.

16. The apparatus of claim 13, wherein the transceiver is further configured to:

communicate, with the second wireless communication device, a configuration indicating the first set of resources.

17. The apparatus of claim 13, wherein the transceiver is further configured to:
communicate, with the second wireless communication device, a configuration indicating the multiple sets of resources.

18. The apparatus of claim 13, wherein the transceiver is further configured to communicate the sequence-based signal based on a code-division multiplexing with another sequence-based signal transmitted by a third wireless communication device using the same first set of resources.

19. The apparatus of claim 13, wherein the first set of resources include a plurality of sets of contiguous subcarriers spaced apart from each other by at least one other set of contiguous subcarriers.

20. The apparatus of claim 19, wherein each set of contiguous subcarriers of the plurality of sets of contiguous subcarriers corresponds to at least one of:
a resource block in the frequency spectrum;
a portion of one of a plurality of resource blocks distributed across the frequency spectrum; or
a portion of one of a plurality of contiguous resource blocks in the frequency spectrum.

21. The apparatus of claim 13, wherein the first set of resources includes a plurality of subcarriers spaced apart from each other by at least one other subcarrier in the frequency spectrum.

22. The apparatus of claim 21, wherein the plurality of subcarriers is within at least one of:
a plurality of resource blocks distributed across the frequency spectrum; or
a plurality of contiguous resource blocks in the frequency spectrum.

23. The apparatus of claim 21, wherein the plurality of subcarriers is within a portion of the frequency spectrum based on a power spectral density (PSD) parameter of the frequency spectrum.

24. The apparatus of claim 21, wherein the first set of resources includes another plurality of subcarriers interlaces with the plurality of subcarriers in the frequency spectrum, wherein the plurality of subcarriers is for communicating first information in the frequency spectrum, wherein the another plurality of subcarriers is for communicating second information in the frequency spectrum, and wherein the transceiver is further configured to communicate the sequence-based signal by:
communicating a first sequence representing the first information using the plurality of subcarriers; or
communicating a second sequence representing the second information using the another plurality of subcarriers.

25. A non-transitory computer-readable medium having computer executable code recorded thereon, the computer executable code, when executed by one or more processors of a first wireless communication device causes the first wireless communication device to perform:
selecting a first set of resources from multiple sets of resources based on a transmission parameter, wherein resources in each set of the multiple sets of resources are spaced apart from each other by at least one other resource in a frequency spectrum, and wherein a resource in the first set of resources and a resource in a second set of resources of the multiple sets of resources include different number of subcarriers; and communicating, with a second wireless communication device in the frequency spectrum, a sequence-based signal in the first set of resources.

26. The non-transitory computer-readable medium of claim 25, wherein the selecting is based on the transmission parameter including at least one of:
- a power spectrum density (PSD) parameter of the frequency spectrum;
- a transmit power utilization factor of the second wireless communication device;
- a subcarrier spacing used for communicating between the first wireless communication device and the second wireless communication device; or
- a transmit power headroom of the second wireless communication device.

27. The non-transitory computer-readable medium of claim 25, wherein the communicating the sequence-based signal is further based on a code-division multiplexing with another sequence-based signal transmitted by a third wireless communication device using the same first set of resources.

28. The non-transitory computer-readable medium of claim 25, wherein the first set of resources include a plurality of sets of contiguous subcarriers spaced apart from each other by at least one other set of contiguous subcarriers, and wherein each set of contiguous subcarriers of the plurality of sets of contiguous subcarriers corresponds to at least one of:
- a resource block in the frequency spectrum;
- a portion of one of a plurality of resource blocks distributed across the frequency spectrum; or
- a portion of one of a plurality of contiguous resource blocks in the frequency spectrum.

29. The non-transitory computer-readable medium of claim 25, wherein the first set of resources includes a plurality of subcarriers spaced apart from each other by at least one other subcarrier in the frequency spectrum, and wherein the plurality of subcarriers is within at least one of:
- a plurality of resource blocks distributed across the frequency spectrum; or
- a plurality of contiguous resource blocks in the frequency spectrum.

30. The non-transitory computer-readable medium of claim 25, wherein the first set of resources include a first plurality of subcarriers interlaces with a second plurality of subcarriers in the frequency spectrum, wherein the first plurality of subcarriers is for communicating first information in the frequency spectrum, wherein the second plurality of subcarriers is for communicating second information in the frequency spectrum, and wherein the communicating includes:
- communicating a first sequence representing the first information using the first plurality of subcarriers; or
- communicating a second sequence representing the second information using the second plurality of subcarriers.

* * * * *